(12) United States Patent
Tsuchida et al.

(10) Patent No.: US 9,021,162 B2
(45) Date of Patent: Apr. 28, 2015

(54) DATA PACKET GENERATION APPARATUS AND DATA PACKET GENERATION METHOD

(75) Inventors: Ryusuke Tsuchida, Tokyo (JP); Akira Ueno, Tokyo (JP); Masami Shimamura, Hanno (JP); Yoshinobu Tanaka, Tokyo (JP); Takashi Yanada, Tokyo (JP); Tomoyuki Sengoku, Tokyo (JP)

(73) Assignee: Olympus Corporation, Tokyo (JP)

( * ) Notice: Subject to any disclaimer, the term of this patent is extended or adjusted under 35 U.S.C. 154(b) by 193 days.

(21) Appl. No.: 13/424,448

(22) Filed: Mar. 20, 2012

(65) Prior Publication Data

US 2012/0246360 A1 Sep. 27, 2012

(30) Foreign Application Priority Data

Mar. 24, 2011 (JP) ................................. 2011-066058

(51) Int. Cl.
*G06F 3/00* (2006.01)
*G06T 1/60* (2006.01)
*G06F 1/32* (2006.01)
*H04N 5/225* (2006.01)

(52) U.S. Cl.
CPC ................ *G06T 1/60* (2013.01); *G06F 1/3203* (2013.01); *H04N 2005/2255* (2013.01)

(58) Field of Classification Search
None
See application file for complete search history.

(56) References Cited

U.S. PATENT DOCUMENTS

| | | | | |
|---|---|---|---|---|
| 5,270,687 A | * | 12/1993 | Killebrew, Jr. | 345/602 |
| 5,802,399 A | * | 9/1998 | Yumoto et al. | 710/66 |
| 5,809,514 A | * | 9/1998 | Nasserbakht et al. | 711/3 |
| 5,974,493 A | * | 10/1999 | Okumura et al. | 710/307 |
| 6,094,711 A | * | 7/2000 | Wong | 711/169 |
| 6,414,609 B1 | * | 7/2002 | Zukawa et al. | 341/67 |
| 7,506,146 B2 | * | 3/2009 | Joshi | 713/1 |
| 7,668,988 B2 | * | 2/2010 | Bertram | 710/65 |
| 8,713,298 B2 | * | 4/2014 | Joshi | 713/1 |
| 8,732,363 B2 | * | 5/2014 | Shimamura et al. | 710/66 |

(Continued)

FOREIGN PATENT DOCUMENTS

| | | | |
|---|---|---|---|
| JP | 05-204373 A | 8/1993 |
| JP | 09-251286 A | 9/1997 |

(Continued)

OTHER PUBLICATIONS

'Video Data Format Converters Using Minimum Numer of Registers' by Keshab K. Parhi, IEEE Transactions on Circuits and Systems for Video Technology, vol. 2, No. 2, Jun. 1992.*

(Continued)

*Primary Examiner* — Steven Snyder
(74) *Attorney, Agent, or Firm* — Westerman, Hattori, Daniels & Adrian, LLP

(57) ABSTRACT

A data processing apparatus may include a data conversion unit for, when converting a plurality of sequentially input data into conversion data of the same bit number as a data bus having a prescribed bit number and sequentially transferring the conversion data. The data conversion unit may include a first data generation unit, a second data generation unit for generating second data obtained by allocating a prescribed second number of input data in the input data not allocated to the first data, to the second bit range and a data coupling unit for coupling the first data and the second data to generate the conversion data having the bit number of the bus width of the data bus.

6 Claims, 17 Drawing Sheets

(56) References Cited

U.S. PATENT DOCUMENTS

| | | | |
|---|---|---|---|
| 2002/0156953 A1* | 10/2002 | Beiley et al. | 710/105 |
| 2006/0174158 A1* | 8/2006 | Check et al. | 714/10 |
| 2006/0218332 A1* | 9/2006 | Boudreau | 710/307 |
| 2008/0126634 A1* | 5/2008 | Gara et al. | 710/100 |
| 2012/0246361 A1* | 9/2012 | Tsuchida et al. | 710/65 |
| 2012/0246364 A1* | 9/2012 | Shimamura et al. | 710/100 |

FOREIGN PATENT DOCUMENTS

| | | |
|---|---|---|
| JP | 2000-305891 A | 11/2000 |
| JP | 2003-223134 A | 8/2003 |
| JP | 2005-286662 A | 10/2005 |
| JP | 2007-298796 A | 11/2007 |
| JP | 2007-312358 A | 11/2007 |
| JP | 2012-203539 A | 10/2012 |
| JP | 2012-203540 A | 10/2012 |
| JP | 2012-203541 A | 10/2012 |
| JP | 2012-203543 A | 10/2012 |

OTHER PUBLICATIONS

'Reordering Memory Bus Transactions for Reduced Power Consumption' by Bruce R. Childers and Tarun Nakra, Proc. of the 2000 ACM SIGPLAN Conference on Languages, Compilers, and Tools for Embedded Systems, pp. 146-161, Jun. 2000.*

'Power Protocol: Reducing Power Dissipation on Off-Chip Data Buses' by K. Basu et al., copyright 2002 IEEE.*

Japanese Office Action dated Jan. 13, 2015, issued in Japanese Application No. 2011-066058; w/English translation; (6 pages).

* cited by examiner

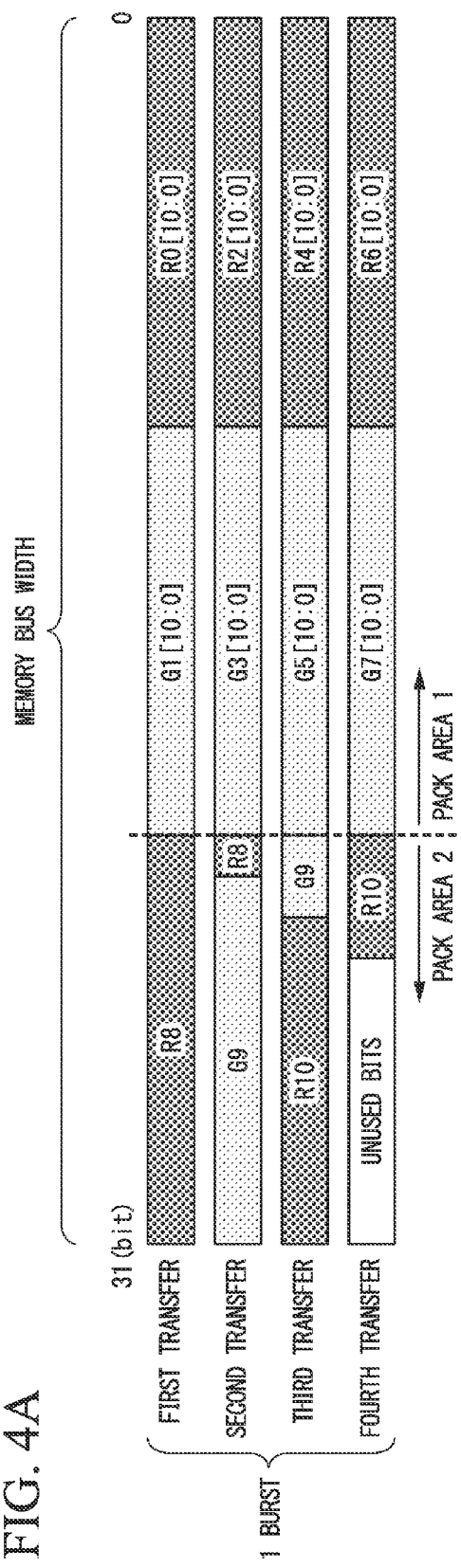
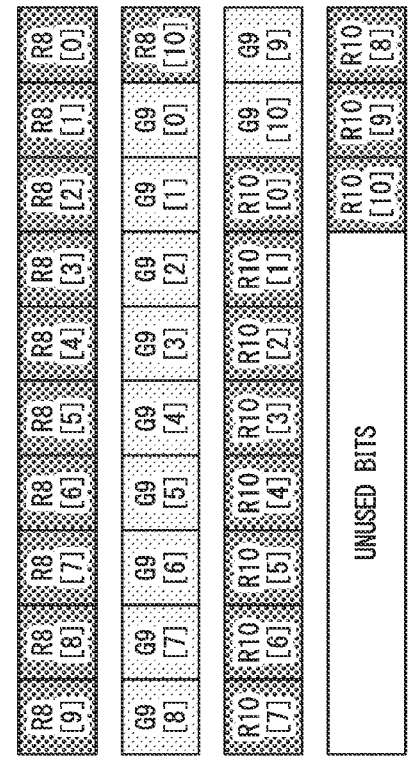
FIG. 4A
FIG. 4B

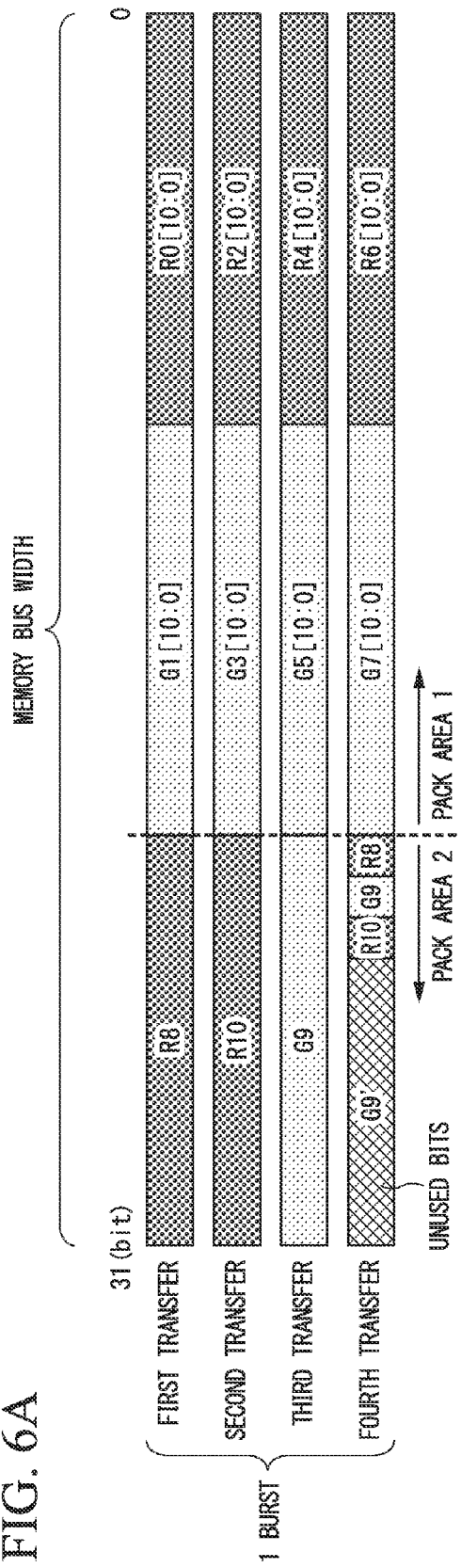
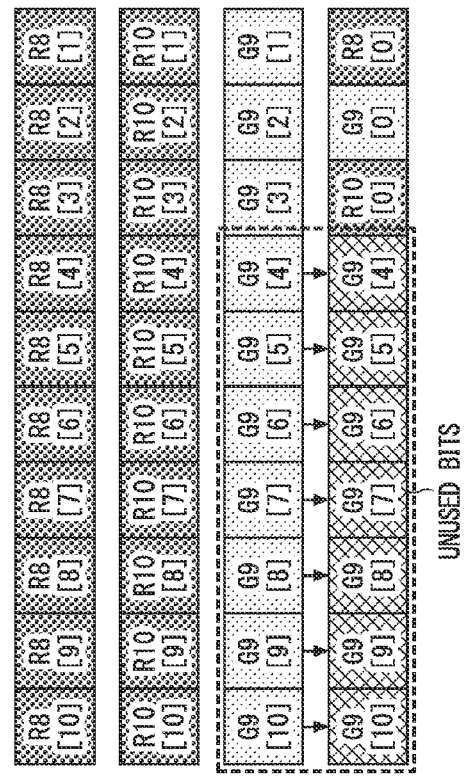
FIG. 6A
FIG. 6B

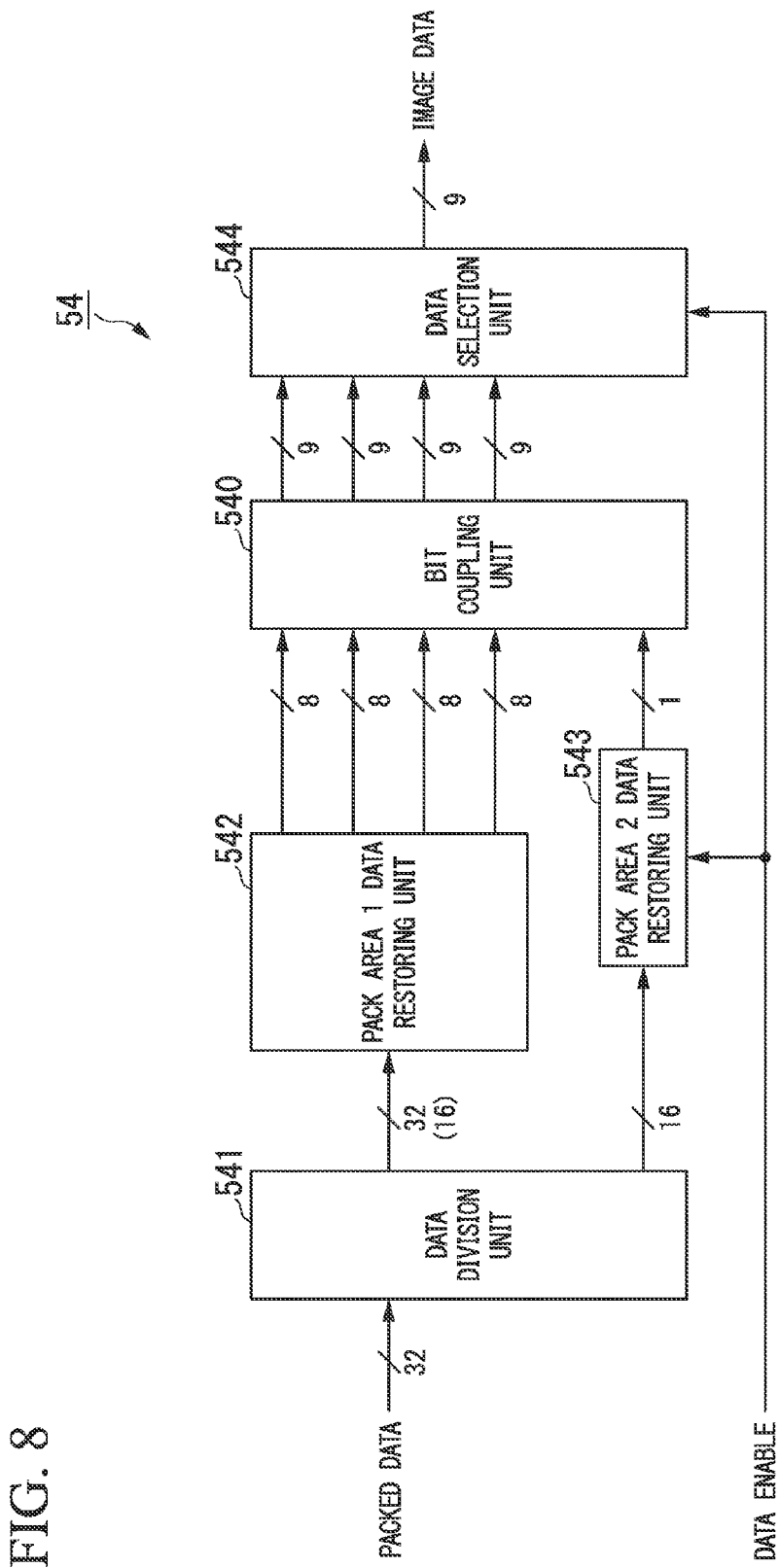

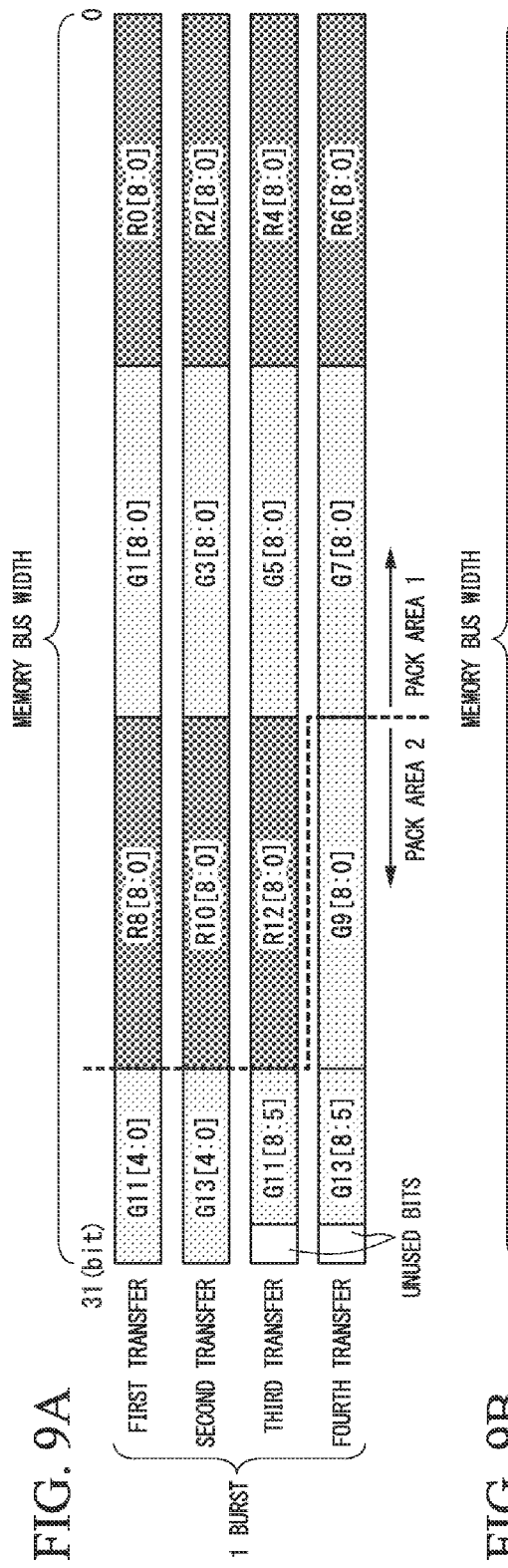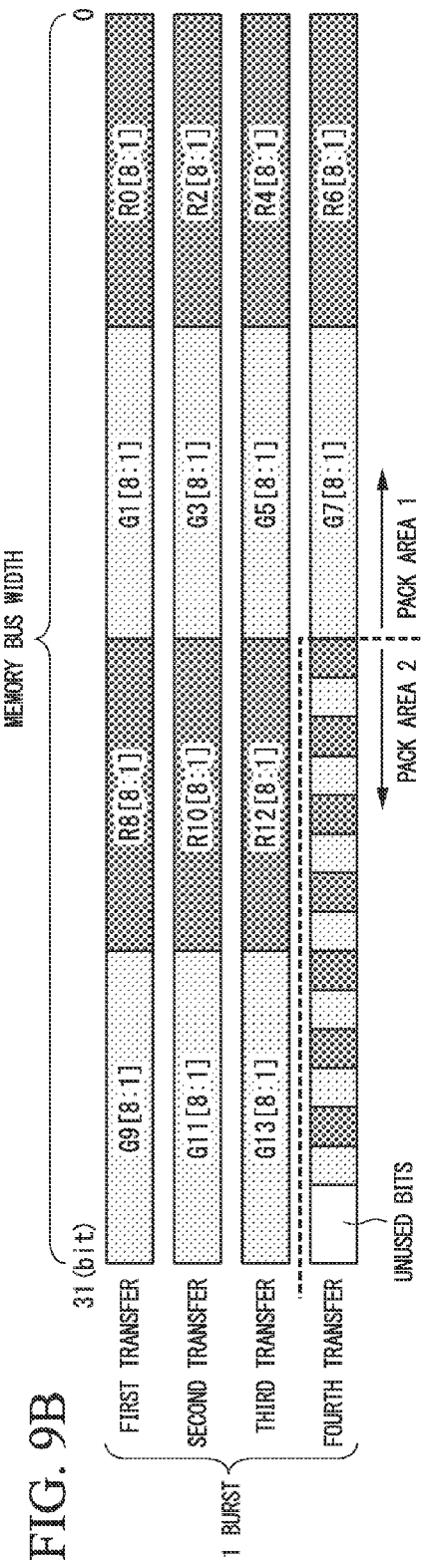

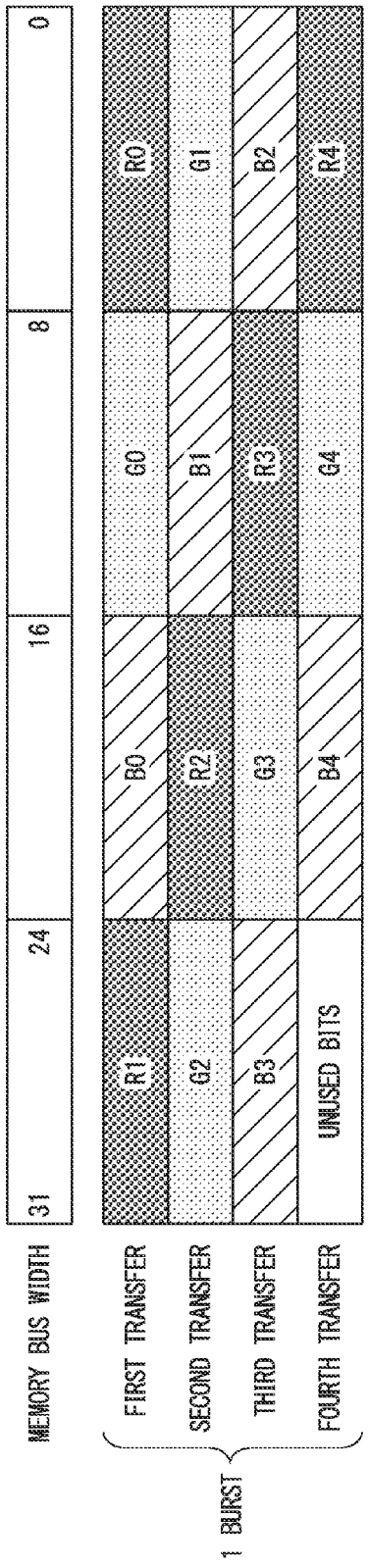
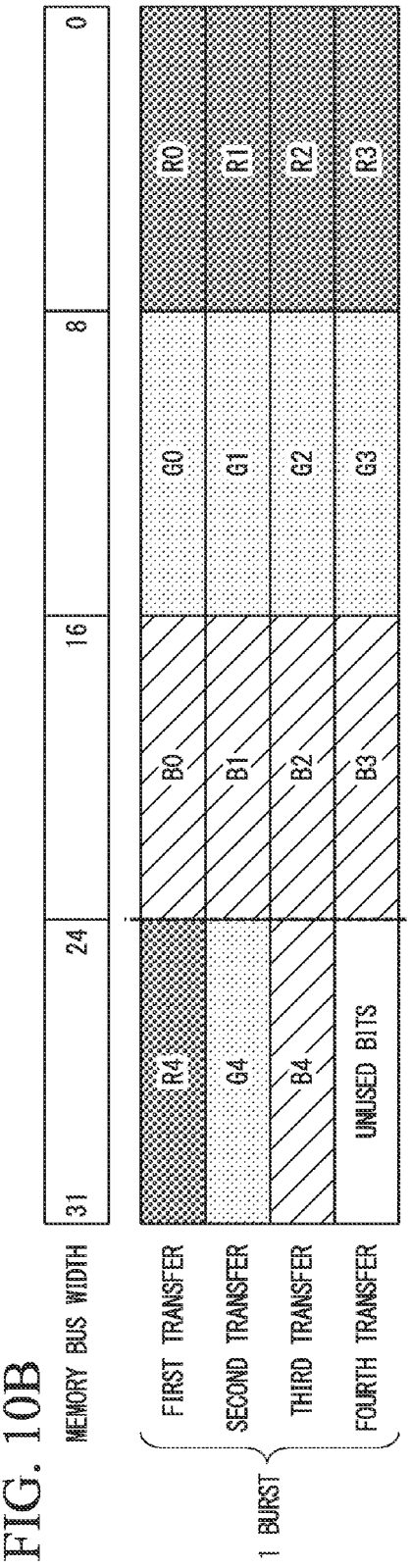
FIG. 10A
FIG. 10B

FIG. 13 PRIOR ART

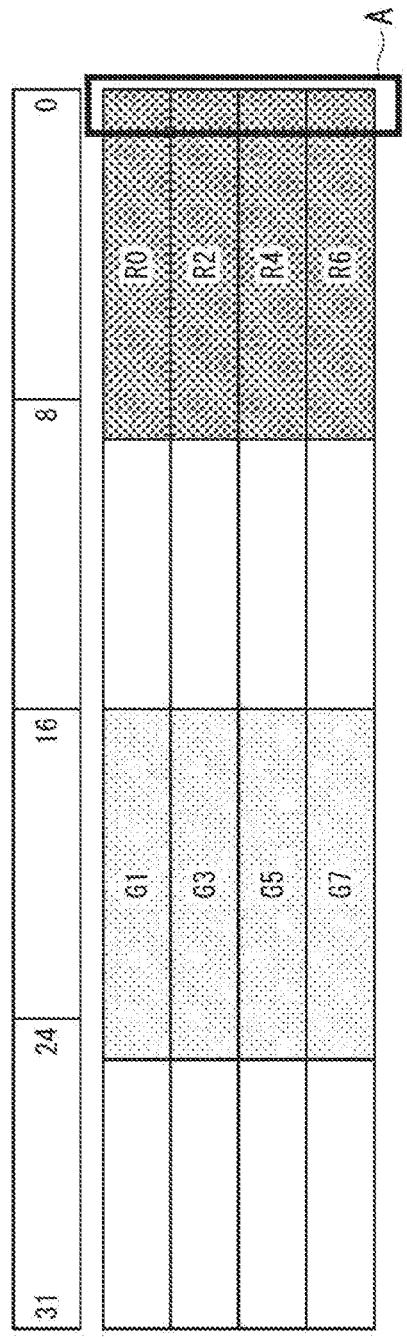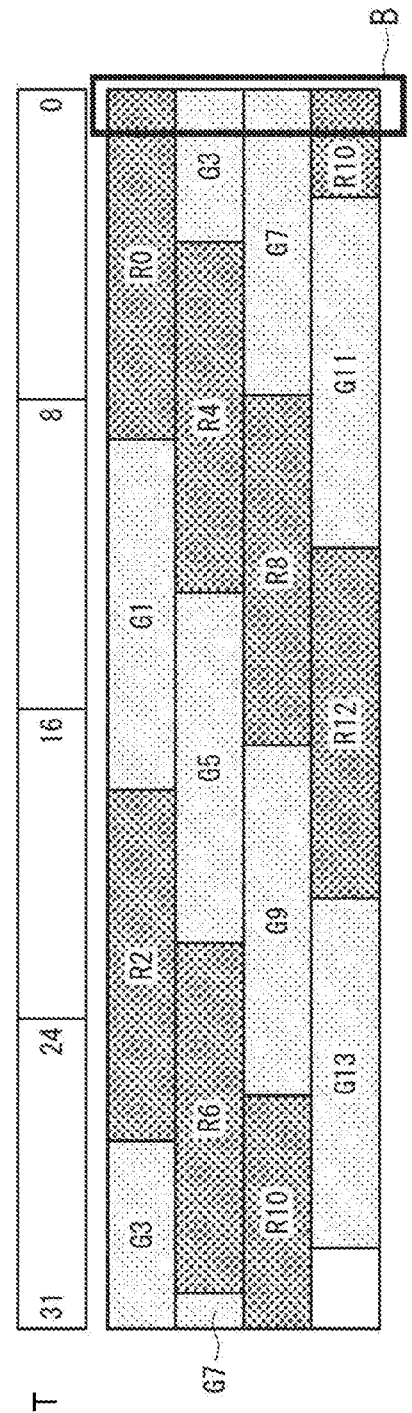
FIG. 16A
PRIOR ART
FIG. 16B
PRIOR ART

DATA PACKET GENERATION APPARATUS AND DATA PACKET GENERATION METHOD

BACKGROUND OF THE INVENTION

1. Field of the Invention

The present invention relates to a data processing apparatus and a data processing method.

Priority is claimed on Japanese Patent Application No. 2011-066058, filed Mar. 24, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

An image pickup device, such as a still camera, a video camera, a medical endoscope camera, or an industrial endoscope camera, processes image data containing data of a great number of pixels (hereinafter referred to as "pixel data") with the increase of the number of pixels and speed of the image pickup device. In such an image pickup device, a memory for temporarily storing image data obtained by photographing is used when each processing block in the image pickup device processes the image data. Image data in each processing step is temporarily stored in the memory.

FIG. 12 is a block diagram illustrating a schematic configuration of an image pickup device in accordance with the related art. For example, image data processing in a photographing operation of the image pickup device shown in FIG. 12 is performed in the following order.

(Step 1)

First, an image pickup processing unit, for example, transmits image data obtained by a CCD (Charge Coupled Device) solid-state image capturing device to a memory via an output DMA (Direct Memory Access) unit to temporarily store the image data.

(Step 2)

Subsequently, an image processing unit reads the image data temporarily stored in the memory via an input DMA unit. The image processing unit performs image processing for recording or display on the read image data. The image processing unit then transmits the processed image data to the memory via the output DMA unit to temporarily store the image data.

(Step 3)

Subsequently, a display processing unit reads the image data subjected to image processing for display via an input DMA unit and causes a display device to display the image data.

Thus, in the image pickup device, the preceding processing block temporarily stores the image data in the memory. The subsequent processing block reads the image data stored in the memory and performs a next process. Thus, as respective processing blocks in the image pickup device perform delivery of the image data, which is a processing target, through the memory, processes of the image pickup device are sequentially performed.

In recent years, it has been desirable for an image pickup device such as a still camera, a video camera or the like to be able to be continuously used for a long time. Accordingly, there is a need for a technique for reducing power consumption of an electrical circuit of the image pickup device. One method of reducing the power consumption of the image pickup device includes a method of increasing a transfer rate for image data between each processing block (electrical circuit) and a memory. The increase of the transfer rate for image data, for example, may be realized by increasing a frequency of an operation clock of the image pickup device or shortening a transfer period of time of the image data between the processing block and the memory. This method reduces power consumption due to transfer of the image data by increasing the transfer rate of the image data.

As a technique of shortening a transfer period of time of image data between the processing block and the memory, a packing technique as disclosed in Japanese Unexamined Patent Application, First Publication No. 2007-312358 (hereinafter referred to as Patent Document 1) is known. The packing technique disclosed in Patent Document 1 is a technique of extending a bus width of a data bus used when each pixel data in the image data is transferred to a memory and arranging (packing) a plurality of adjacent pixel data in the data bus to transfer a plurality of pixel data at a single time. Using this technique, the number of data transfers required to transfer all pixel data can be further reduced as compared with conventional data transfer in which pixel data is transferred pixel by pixel, and the period of time for data transfer of the image data can be shortened. FIG. 15 is a diagram illustrating an example of an arrangement of image data. For example, when pixel data as shown in FIG. 15 obtained from a 16×16 Bayer arrangement CCD is transferred to a memory, in the packing technique disclosed in Patent Document 1, pixel data for 4 pixels is one transfer unit, thus reducing a transfer period of the image data to ¼. Accordingly, it is possible to reduce power consumption of an electrical circuit in the image pickup device, unlike a case in which pixel data is transferred to the memory pixel by pixel.

As a technique of further shortening the transfer period of image data, a packing method using burst transfer of DMA is considered. This is a method in which one burst, which is a memory access unit at a prescribed certain number of cycles, is considered a pixel data packing unit. FIGS. 14A and 14B are diagrams illustrating an example of pixel data packing in accordance with the related art. FIG. 14A illustrates a packing method disclosed in Patent Document 1. An example in which the pixel data shown in FIG. 13 is packed is shown in FIG. 14A. FIG. 14B illustrates an example in which the pixel data shown in FIG. 13 is packed in a burst unit. An example in which a bus width (hereinafter referred to as "memory bus width") of a data bus used when the pixel data is transferred to the memory (hereinafter referred to as "memory bus") is 32 bits, and memory access for one cycle in burst transfer (hereinafter referred to as "one transfer") is performed four times, that is, one burst transfer is performed through four transfers, is shown in FIGS. 14A and 14B. An example in which resolution of pixel data of one pixel, that is, a bit number of the pixel data is 9, 10, 12, and 14 from top to bottom, is shown in FIGS. 14A and 14B.

In the packing method disclosed in Patent Document 1 shown in FIG. 14A, pixel data for two pixels per one transfer can be arranged on a memory bus, and pixel data for 8 pixels per one burst can be transferred to the memory. On the other hand, in the burst unit-based packing method shown in FIG. 14B, pixel data for 14, 12, 10, and 9 pixels can be transferred to the memory. In the packing method disclosed in Patent Document 1, since pixel data is arranged (packed) in the memory bus width, that is, in a unit of one transfer, a sum of bit numbers of a plurality of arranged pixel data must not exceed the memory bus width. Accordingly, in the packing method disclosed in Patent Document 1, there are bits to which pixel data cannot be allocated (hereinafter referred to as "unused bits") within the memory bus width. On the other hand, in the burst unit-based packing method, since pixel data is arranged (packed) in units of bursts, even when a sum of bit numbers of a plurality of arranged pixel data exceeds the memory bus width, the pixel data can be arranged (packed) in a next transfer as long as the sum does not exceed one burst, as in FIG. 14B. That is, in the burst unit-based packing method, even when the memory bus width is not an integer times the resolution of pixel data, the pixel data can be arranged (mapped) over one transfer unit, which can reduce the number of unused bits. Accordingly, in the burst unit-based packing method, much pixel data can be transferred to the memory in the same time, that is, the transfer period of time of the image data can be shortened, and the power consumption of the electrical circuit in the image pickup device can be further reduced, as compared with the packing method disclosed in Patent Document 1.

In general, when data change (change (inversion) of data "0"→"1" or "1"→"0") is less, power consumption is known to be lower. Accordingly, reducing the power consumption of the image pickup device by reducing the data change on the memory bus between each processing block (electrical circuit) and a memory in an image pickup device is also considered. FIGS. 15A, 15B, 15C and 15D are diagrams illustrating a relationship between the data change on the data bus (memory bus) between the processing block and the memory in the image pickup device and the power consumption. FIG. 15A illustrates an example in which a bus width of a memory bus between the image pickup processing unit and the memory in the image pickup device shown in FIG. 12 is 32 bits. The data change on the memory bus is schematically shown in FIGS. 15B to 15D. In the example of FIGS. 15A, 15B, 15C and 15D, power consumption is lowest in the case of FIG. 15B in which there is no data change on the memory bus, and highest in the case of FIG. 15D in which there are the most data changes on the memory bus.

It can be seen from the above that if there is a great amount of change in pixel data between two continuous transfers (e.g., pixel data in first and second transfers of each burst transfer shown in FIGS. 14A and 14B) in the burst transfer between each processing block and the memory in the image pickup device, power consumption due to the transfer of the image data increases. That is, the power consumption due to the transfer of the image data varies in proportion to the number of the same bits (bit number) on the memory bus changing between the two transfers.

In general, there is expected to be a small amount of change in data between adjacent pixels in image data, and bits whose values are being inverted are expected to be less than bits whose values are not being inverted when the same bits of each pixel data of adjacent pixels are compared. FIGS. 16A and 16B are diagrams illustrating an example of a data arrangement state in a pixel data packing method in accordance with the related art. Here, when the packing method disclosed in Patent Document 1 and the burst unit-based packing method, which are shown in FIGS. 14A and 14B, are compared with each other, the power consumption due to the transfer of the image data is lower in the packing method disclosed in Patent Document 1 in which the same bits are aligned in pixel data with the same colors, as shown in FIGS. 16A and 16B. Further, FIGS. 16A and 16B show a case in which the bit number of pixel data of one pixel is 9 in the packing method disclosed in Patent Document 1 and the burst unit-based packing method shown in FIGS. 14A and 14B.

More specifically, in the packing method disclosed in Patent Document 1 shown in FIG. 16A, least significant bits of the memory bus shown in a range A are all the same bits (least significant bits) of pixel data with the same colors. On the other hand, in the burst unit-based packing method shown in FIG. 16B, least significant bits of the memory bus shown in a range B are all different bits of pixel data having different colors. It can be seen from this that, when locations of bits of pixel data arranged on the memory bus are made different between two continuous transfers by packing the image data in a burst unit, a change amount of the same bits on the memory bus becomes great and the power consumption due to the transfer of the image data increases.

That is, in the packing method disclosed in Patent Document 1 shown in FIG. 16A, the power consumption due to the transfer of the image data is low, but data transfer efficiency is low. In the burst unit-based packing method shown in FIG. 16B, the data transfer efficiency is low, but the power consumption due to the transfer of the image data is high.

Thus, more pixel data is arranged on the memory bus when packing the pixel data into the burst units. As a result, the transfer period of time of the pixel data can be shortened and the power consumption due to transfer of the image data can be reduced. However, since locations of bits of the pixel data arranged on the memory bus are different between two continuous transfers, sufficient reduction of the power consumption due to the transfer of the image data cannot be obtained.

FIG. 17 is a diagram illustrating another example of a data arrangement state in the pixel data packing method in accordance with the related art. In the packing method disclosed in Patent Document 1, for example, pixel data for 3 pixels can be arranged (packed) in one transfer to pack the pixel data, as shown in FIG. 17. However, in this case, for example, least significant bits of a memory bus shown in a range C are the same bits (least significant bits) of the pixel data, but are pixel data having different colors. Pixel data having different colors is highly likely to be greatly different in value, and even in the packing method disclosed in Patent Document 1, the power consumption due to the transfer of the image data is not reduced due to the pixel data arrangement in one transfer.

SUMMARY

The present invention provides a data processing apparatus and a data processing method capable of reducing power consumption due to data transfer while maintaining data transfer efficiency.

A data processing apparatus may include: a data conversion unit configured to arrange the input data in each conversion unit by using the conversion data as one transfer unit and a prescribed number of transfer units as one conversion unit when converting a plurality of sequentially input data into conversion data of the same bit number as a data bus having a prescribed bit number and sequentially transferring the conversion data. The data conversion unit may include: a first data generation unit configured to divide a bus width of the data bus into a first bit range having a prescribed first bit number and a second bit range having a second bit number obtained by subtracting the first bit number from a total bit number of the data bus, the first data generation unit sequentially generating first data obtained by allocating a prescribed first number of input data to the first bit range so that the same bits of the input data having the same type of information in the plurality of the input data are continuously transferred in the same bits of the data bus; a second data generation unit configured to generate second data obtained by allocating a prescribed second number of input data in the input data not allocated to the first data, to the second bit range; and a data coupling unit configured to couple the first data and the second data to generate the conversion data having the bit number of the bus width of the data bus.

The second data generation unit may sequentially allocate respective bits of the input data to the respective bits of the second bit range so that the second number of input data is continuous in the second data of the plurality of transfer units contained in the same conversion unit.

The second data generation unit may divide each of the second number of input data into input data of the second bit number of upper bits and input data of lower bits having a bit number obtained by subtracting the bit number of the input data of the upper bits from a total bit number of the input data, allocate respective bits of the input data of the upper bits in respective bits of the second bit range so that the same bits of two input data of the upper bits having the same type of information in the divided input data of the upper bits are allocated to the same bits in the second data of two continuous transfer units contained in the same conversion unit, and sequentially allocate respective bits of the input data of the lower bits in respective bits of the second bit range to be continuous in the second data contained in the same vacant conversion unit after allocating the input data of the upper bits.

The second data generation unit may allocate the same data as the same bits of the second data of an immediately previous transfer unit contained in the same conversion unit to respective bits of the second vacant data after allocating the input data.

The data conversion unit may further include an input data division unit for dividing the input data into input data of upper bits having a prescribed bit number and input data of lower bits having a bit number obtained by subtracting the bit number of the input data of the upper bits from a total bit number of the input data, the first data generation unit allocates each bit of the input data of the upper bits to each bit of the first bit range, and the second data generation unit allocates each bit of the input data of the lower bits to each bit of the second bit range.

A data processing apparatus may include: a data inverse-conversion unit that sequentially inverse-converts conversion data of the same bit number as a data bus having a prescribed bit number to restore a plurality of original input data, the conversion data being obtained through conversion from the plurality of input data and sequentially transferred in each conversion unit using one conversion data as one transfer unit and a prescribed number of transfer units as one conversion unit. The data inverse-conversion unit may include: a data division unit that sequentially divides the conversion data containing first data and second data into the first data and the second data, a bus width of the data bus being divided into a first bit range having a prescribed first bit number and a second bit range having a second bit number obtained by subtracting the first bit number from a total bit number of the data bus, the first data being obtained by allocating a prescribed first number of input data to the first bit range so that the same bits of the input data having the same type of information in the plurality of the input data are continuously transferred in the same bits of the data bus, and the second data being obtained by allocating a prescribed second number of input data in the input data not allocated to the first data, to the second bit range; a first data restoring unit that divides the first number of input data contained in the first data into the respective input data; a second data restoring unit that divides the second number of input data contained in the second data into the respective input data; and a data selection unit that selects the respective divided input data.

In the second data, respective bits of the second number of input data may be sequentially allocated to respective bits of the second bit range to be continuous in the second data of a plurality of transfer units contained in the same conversion unit.

In the second data, each of the second number of input data may be divided into input data of the second bit number of upper bits and input data of lower bits having a bit number obtained by subtracting the bit number of the input data of the upper bits from a total bit number of the input data, the same bits of two input data of the upper bits having the same type of information in the divided input data of upper bits are allocated to the same bits of the second bit range of two continuous transfer units contained in the same conversion unit, and the respective bits of the divided input data of the lower bits are sequentially allocated to the respective bits of the second bit range contained in the same vacant conversion unit after the respective bits of the input data of the upper bits are allocated, to be continuous in the second bit range.

In the second data, the same data as the same bits of the second data of an immediately previous transfer unit contained in the same conversion unit may be allocated.

The data inverse-conversion unit may further include: an input data coupling unit that couples input data of upper bits having a prescribed bit number of the input data allocated to each bit of the first bit range and input data of lower bits having a bit number obtained by subtracting the bit number of the input data of the upper bits from a total bit number of the input data allocated to the respective bits of the second bit range, and the data selection unit selects the respective coupled input data.

A data processing method may include: a data conversion step of, when converting a plurality of sequentially input data into conversion data of the same bit number as a data bus having a prescribed bit number and sequentially transferring the conversion data, arranging the input data in each conversion unit using the conversion data as one transfer unit and a prescribed number of transfer units as one conversion unit. The data conversion step may include: a first data generation step of dividing a bus width of the data bus into a first bit range having a prescribed first bit number and a second bit range having a second bit number obtained by subtracting the first bit number from a total bit number of the data bus, and sequentially generating first data obtained by allocating a prescribed first number of input data to the first bit range so that the same bits of the input data having the same type of information in the plurality of the input data are continuously transferred in the same bits of the data bus; a second data generation step of generating second data obtained by allocating a prescribed second number of input data in the input data not allocated to the first data, to the second bit range; and a data coupling step of coupling the first data and the second data to generate the conversion data having the bit number of the bus width of the data bus.

A data processing method may include: a data inverse-conversion step of sequentially inverse-converting conversion data of the same bit number as a data bus having a prescribed bit number to restore a plurality of original input data, the conversion data being obtained through conversion from the plurality of input data and sequentially transferred in each conversion unit using one conversion data as one transfer unit and a prescribed number of transfer units as one conversion unit. The data inverse-conversion step may include: a data division step of sequentially dividing the conversion data containing first data and second data into the first data and the second data, a bus width of the data bus being divided into a first bit range having a prescribed first bit number and a second bit range having a second bit number obtained by subtracting the first bit number from a total bit number of the data bus, the first data being obtained by allocating a prescribed first number of input data to the first bit range so that the same bits of the input data having the same type of information in the plurality of the input data are continuously transferred in the same bits of the data bus, and the second data being obtained by allocating a prescribed second number of input data in the input data not allocated to the first data, to the second bit range; a first data restoring step of dividing the first number of input data contained in the first data into the respective input data; a second data restoring step of dividing the second number of input data contained in the second data into the respective input data; and a data selection step of selecting the respective divided input data.

According to the present invention, it is possible to reduce power consumption due to data transmission while maintaining data transfer efficiency.

BRIEF DESCRIPTION OF THE DRAWINGS

The above features and advantages of the present invention will be more apparent from the following description of certain preferred embodiments taken in conjunction with the accompanying drawings, in which:

FIGS. 4A and 4B are diagrams illustrating a first data arrangement method in the data conversion unit of the first configuration;

FIGS. 6A and 6B are diagrams illustrating a third data arrangement method in the data conversion unit of the first configuration;

FIG. 8 is a block diagram illustrating a schematic configuration of the data inverse-conversion unit of the second configuration included in the image pickup device in accordance with the first preferred embodiment of the present invention;

FIGS. 9A, 9B and 9C are diagrams illustrating a fourth data arrangement method in the data conversion unit of the second configuration;

FIGS. 10A and 10B are diagrams illustrating an example in which the data arrangement method in the data conversion unit included in the image pickup device in accordance with the first preferred embodiment of the present invention is applied to another image data;

Figure 13:
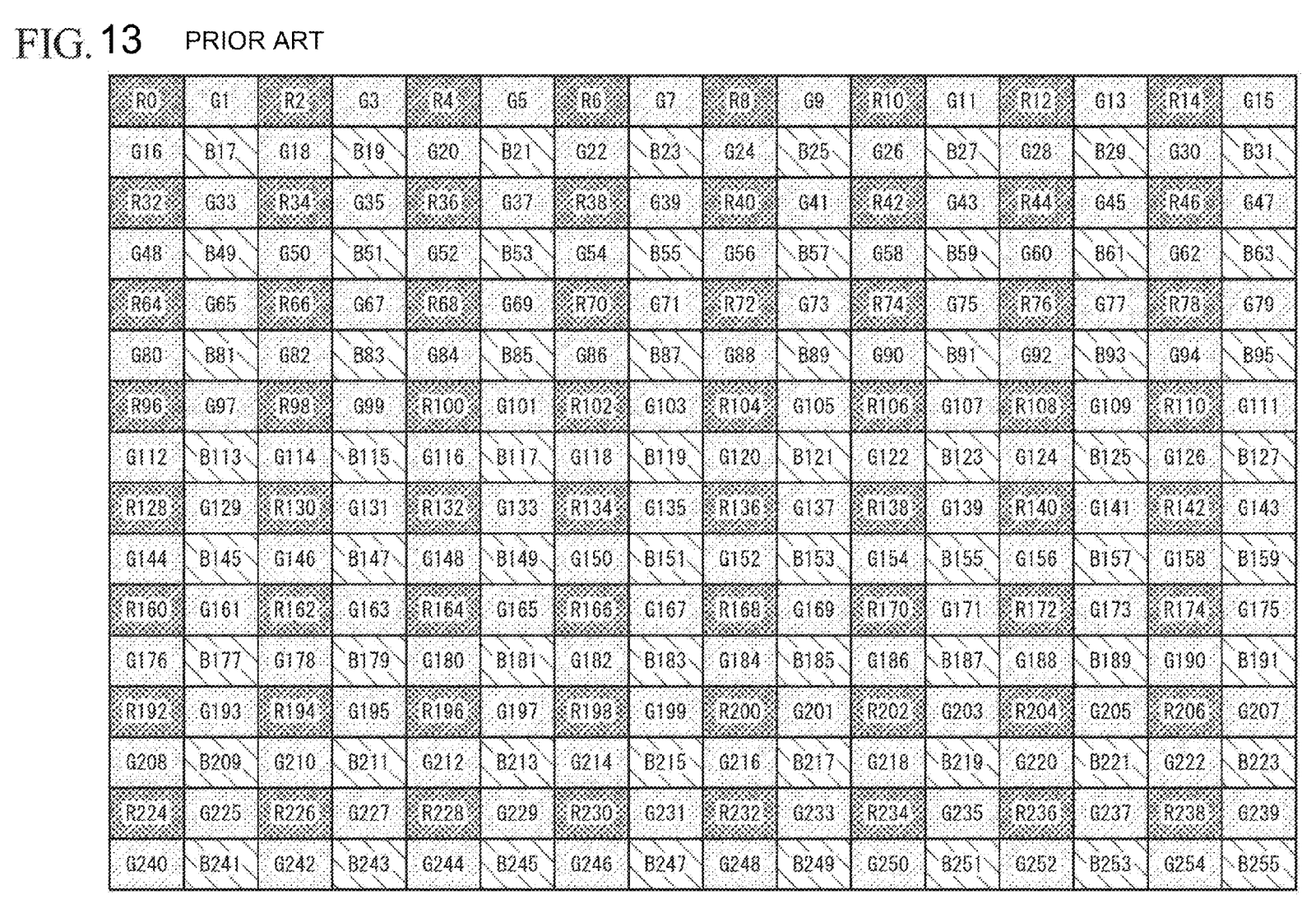

FIG. 13 is a diagram illustrating an example of an arrangement of image data;

FIGS. 16A and 16B are diagrams illustrating an example of a data arrangement state in a pixel data packing method in accordance with the related art.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1:
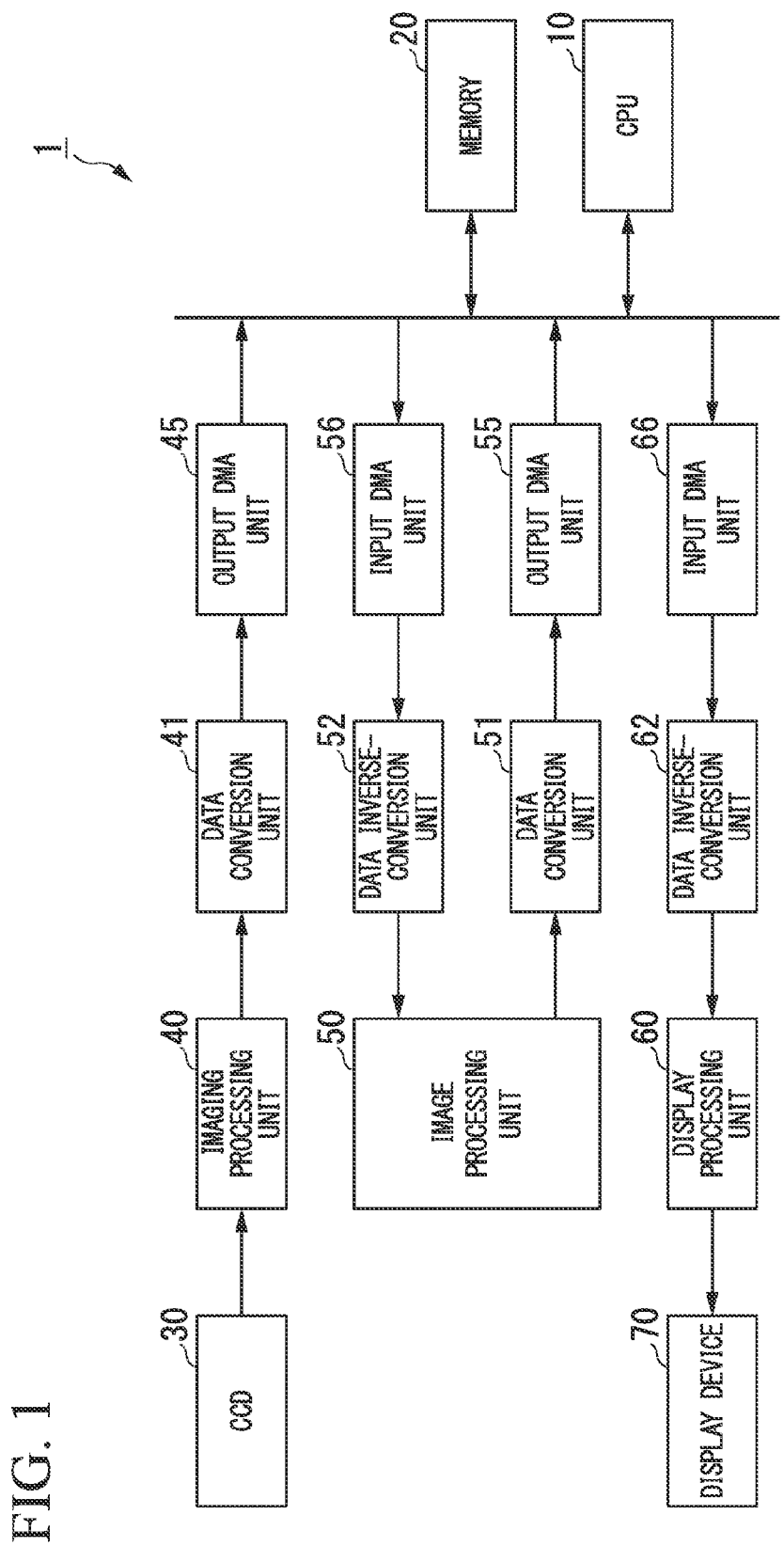
FIG. 1 is a block diagram illustrating a schematic configuration of an image pickup device in accordance with a first preferred embodiment of the present invention.

FIG. 1 is a block diagram illustrating a schematic configuration of an image pickup device in accordance with a first preferred embodiment of the present invention. The image pickup device 1 shown in FIG. 1 includes a CPU 10, a memory 20, a CCD 30, an image pickup processing unit 40, an image processing unit 50, a display processing unit 60, a display device 70, data conversion units 41 and 51, data inverse-conversion units 52 and 62, output DMA units 45 and 55, and input DMA units 56 and 66. The image pickup device 1 has a function of recording image data obtained through photographing. However, for convenience of a description, a case in which image data obtained through photographing is displayed will be described hereinafter. Only a connection of a memory bus that is a data bus associated with pixel data delivery between respective components (processing blocks) in the image pickup device 1 is shown in FIG. 1.

The CPU 10 is a control device that performs overall control of the image pickup device 1.

The memory 20, for example, is a memory such as a DRAM (Dynamic Random Access Memory) for temporarily storing pixel data processed by each processing block in the image pickup device 1. Pixel data in each processing step of each processing block in the image pickup device 1 is temporarily stored in the memory 20.

The CCD 30, for example, is a solid-state image capturing device having a Bayer arrangement for converting incident subject light into an image signal. The CCD 30 outputs a subject pixel signal to the image pickup processing unit 40.

The image pickup processing unit 40 performs prescribed signal processing on the pixel signal input from the CCD 30 to generate image data.

The image processing unit 50 performs various image processing in the image pickup device 1 on the image data generated by the image pickup processing unit 40 to generate image data.

The display processing unit 60 converts the image data image-processed by the image processing unit 50 into display data according to the display device 70. The display processing unit 60 outputs the converted display data to the display device 70.

The display device 70, for example, is a display device such as a liquid crystal display for displaying the display data.

In the image pickup device 1 in accordance with the first preferred embodiment of the present invention, a pixel signal for a subject captured by the CCD 30 is processed by the image pickup processing unit 40, the image processing unit 50, and then the display processing unit 60, and displayed on the display device 70. In this case, the image data in each processing step is delivered between the respective processing blocks via the memory 20. The data conversion units 41 and 51, the data inverse-conversion units 52 and 62, the output DMA units 45 and 55, and the input DMA units 56 and 66 in the image pickup device 1 are processing blocks associated with delivery of the image data in each processing step.

The data conversion unit 41 or 51 arranges respective pixel data in the image data input from a preceding processing block (the image pickup processing unit 40 or the image processing unit 50 in accordance with the first preferred embodiment of the present invention shown in FIG. 1) in respective bits of the memory bus using a prescribed arranging (packing) method. Configurations of the data conversion units 41 and 51 and a pixel data packing method in the data conversion units 41 and 51 will be described in detail later.

The output DMA unit 45 or 55 writes (stores) the image data consisting of the pixel data packed in respective bits of the memory bus by the data conversion unit 41 or 51 to the memory 20 through DMA access.

The input DMA unit 56 or 66 reads the image data stored in the memory 20 through DMA access and outputs the read image data to the data inverse-conversion unit 52 or 62.

The data inverse-conversion unit 52 or 62 restores the pixel data contained in the image data input from the DMA unit 56 or 66 to original image data using a method reverse to the prescribed arranging (packing) method and outputs the original image data to a subsequent processing block (the image processing unit 50 or the display processing unit 60 in accordance with the first preferred embodiment of the present invention shown in FIG. 1). Configurations of the data inverse-conversion units 52 and 62 will be described in detail later.

Here, image data processing in the image pickup device 1 shown in FIG. 1 will be described. In a photographing operation in the image pickup device 1, image data processing is performed in the following order.

(Step 1)

First, the image pickup processing unit 40 performs prescribed signal processing on a pixel signal for a subject captured by the CCD 30 to generate image data (e.g., image data according to a pixel arrangement of the CCD 30). The image pickup processing unit 40 transfers the generated image data to the memory 20 via the data conversion unit 41 and the output DMA unit 45 and temporarily stores the image data.

(Step 2)

Subsequently, the image processing unit 50 reads the image data temporarily stored in the memory 20 via the input DMA unit 56 and the data inverse-conversion unit 52. The image processing unit 50 performs image processing for recording or display on the read image data to generate image data (e.g., RGB data, or YCbCr data having a YC422 dot sequential format). Then, the image processing unit 50 transfers the generated image data to the memory 20 via the data conversion unit 51 and the output DMA unit 55 again and temporarily stores the image data.

(Step 3)

Subsequently, the display processing unit 60 reads the image data subjected to image processing for displaying by the image processing unit 50 or image data for OSD (On-Screen Display) display separately stored in the memory 20, via the input DMA unit 66 and the data inverse-conversion unit 62, and causes the display device 70 to display the image data.

When the image pickup device 1 records the image data obtained through photographing, a recording processing unit for performing an image data recording process, which is not shown, reads the image data subjected to image processing for recording by the image processing unit 50 via an input DMA unit and a data inverse-conversion unit, which are not shown, and records the read image data for recording in an image data recording unit, such as a memory card, that is not shown. Further, when the image pickup device 1, for example, has a function of inputting/outputting sound, an audio processing unit for performing audio processing, which is not shown, stores audio data upon photographing in the memory 20 via a data conversion unit and an output DMA unit that are not shown. Further, the audio processing unit reads audio data stored in the memory 20 via an input DMA unit and a data inverse-conversion unit that are not shown, and causes a sound output unit such as a speaker, which is not shown, to output sound according to the read audio data.

First Configuration

Next, the data conversion units in the image pickup device 1 will be described. Further, as described above, the data conversion unit 41 and the data conversion unit 51 differ from each other only in preceding and subsequent processing blocks connected thereto. More specifically, as shown in FIG. 1, the data conversion unit 41 is arranged between the preceding image pickup processing unit 40 and the subsequent output DMA unit 45, and the data conversion unit 51 is arranged between the preceding image pickup processing unit 50 and the subsequent output DMA unit 55. Accordingly, the data conversion unit 41 and the data conversion unit 51 differ from each other only in data formats of input image data and output image data. Hereinafter, the data conversion unit 41 will be described as a representative.

Figure 2:
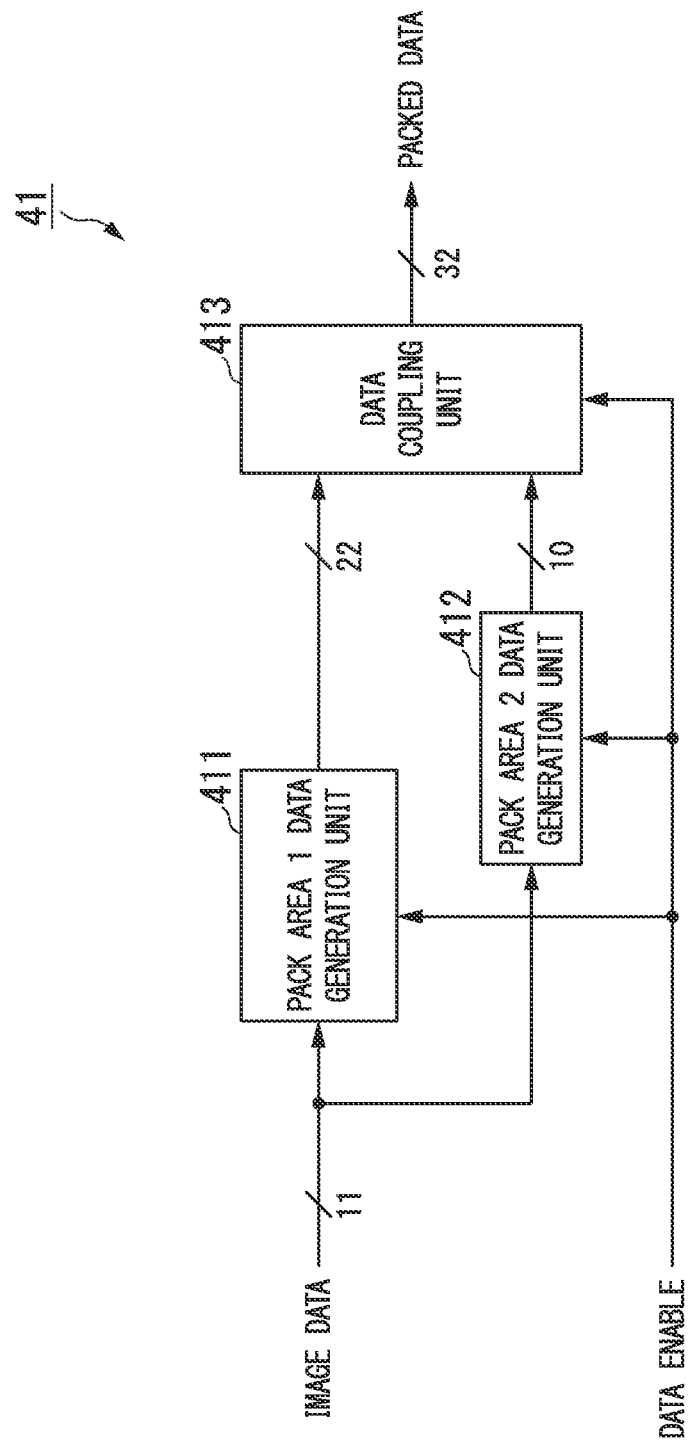
FIG. 2 is a block diagram illustrating a schematic configuration of a data conversion unit of a first configuration included in the imaging apparatus in accordance with the first preferred embodiment of the present invention.

FIG. 2 is a block diagram illustrating a schematic configuration of the data conversion unit 41 of a first configuration included in the image pickup device 1 in accordance with the first preferred embodiment of the present invention. As shown in FIG. 2, the data conversion unit 41 includes a pack area 1 data generation unit 411, a pack area 2 data generation unit 412, and a data coupling unit 413.

In the following description, it is assumed that the image data having the 16×16 Bayer arrangement as shown in FIG. 15 (hereinafter referred to as "Bayer data") is input to the data conversion unit 41, a packing unit for each pixel data in the Bayer data consists of four transfers, and the four transfers form a burst transfer unit, that is, one burst is a pixel data packing unit. Further, a bit number of each pixel data in the Bayer data is 11, and a bus width of the memory bus (memory bus width) is 32 bits. Further, in the Bayer data shown in FIG. 15, numbers of the pixel data represent positions of a pixel in the CCD 30, and "R," "G," and "B" before the numbers represent colors of the pixel in the CCD 30. More specifically, "R" represents pixel data of a red pixel of the CCD 30, "G" represents pixel data of a green pixel of the CCD 30, and "B" represents pixel data of a blue pixel of the CCD 30.

The data conversion unit 41 arranges data of each bit of 11-bit pixel data input from the image pickup processing unit 40 in each bit on the memory bus using any of prescribed packing methods, which will be described later, to output 32-bit pack data. The data conversion unit 41 divides the packing unit into a 22-bit area in which respective continuous bits of the pixel data are directly in respective continuous bits on the memory bus (hereinafter referred to as "pack area 1") and a 10-bit area in which respective bits of the pixel data are divided and arranged in vacant bits on the memory bus in which the pixel data has not been arranged (hereinafter referred to as "pack area 2") and arranges respective bits of the pixel data in the respective bits on the memory bus.

The pixel data arranged in pack area 1 and the pixel data arranged in pack area 2 in the data conversion unit 41 are determined based on a data enable signal input from the image pickup processing unit 40. This data enable signal is a signal containing information indicating what color of the pixel of the CCD 30 is input to the data conversion unit 41.

The pack area 1 data generation unit 411 arranges pixel data for two pixels in respective bits of the data bus of pack area 1 (hereinafter described as "memory bus" since the data bus corresponds to bits of the memory bus), for example, sequentially from bits in positions corresponding to lower bits of the memory bus, based on the data enable signal input from the image pickup processing unit 40. The pack area 1 data generation unit 411 outputs the pixel data of pack area 1 (hereinafter referred to as "pack area 1 data") having a bit number (22 bits in FIG. 2) equal to or less than a width of the memory bus in which the pixel data is sequentially arranged, to the data coupling unit 413. Further, the pack area 1 data generation unit 411 arranges the pack area 1 data so that adjacent pixel data with the same colors in data between two continuous transfers when burst-transferring the pixel data to the memory 20 is arranged in the same bits on the memory bus.

The pack area 2 data generation unit 412 arranges pixel data for 3 pixels in respective bits of the data bus of pack area 2 (hereinafter referred to as "memory bus" since the data bus corresponds to respective bits of the memory bus), based on the data enable signal input from the image pickup processing unit 40. The pack area 2 data generation unit 412 outputs pixel data of pack area 2 (hereinafter referred to as "pack area 2 data") of a bit number (10 bits in FIG. 2) equal to or less than the memory bus width in which the pixel data has been arranged, to the data coupling unit 413. Further, the pack area 2 data generation unit 412 arranges the pack area 2 data according to a prescribed packing method, which will be described later.

The data coupling unit 413 couples the pack area 1 data input from the pack area 1 data generation unit 411 to the pack area 2 data input from the pack area 2 data generation unit 412 to generate packed data. The data coupling unit 413 sequentially outputs the generated packed data to the output DMA unit 45. Further, the data coupling unit 413, for example, includes a memory unit for temporarily storing the 22-bit pack area 1 data. The data coupling unit 413 matches timings of the 22-bit pack area 1 data and the 10-bit pack area 2 data to generate 32-bit pack data based on the data enable signal input from the image pickup processing unit 40.

Next, the data inverse-conversion units in the image pickup device 1 will be described. As described above, the data inverse-conversion unit 52 and the data inverse-conversion unit 62 differ from each other only in the preceding and subsequent processing blocks connected thereto. More specifically, as shown in FIG. 1, the data inverse-conversion unit 52 is arranged between the preceding input DMA unit 56 and the subsequent image processing unit 50, and the data inverse-conversion unit 62 is arranged between the preceding input DMA unit 66 and the subsequent display processing unit 60. Accordingly, the data inverse-conversion unit 52 and the data inverse-conversion unit 62 differ from each other only in data formats of input image data and output image data. Hereinafter, the data inverse-conversion unit 52 will be described as a representative.

Figure 3:
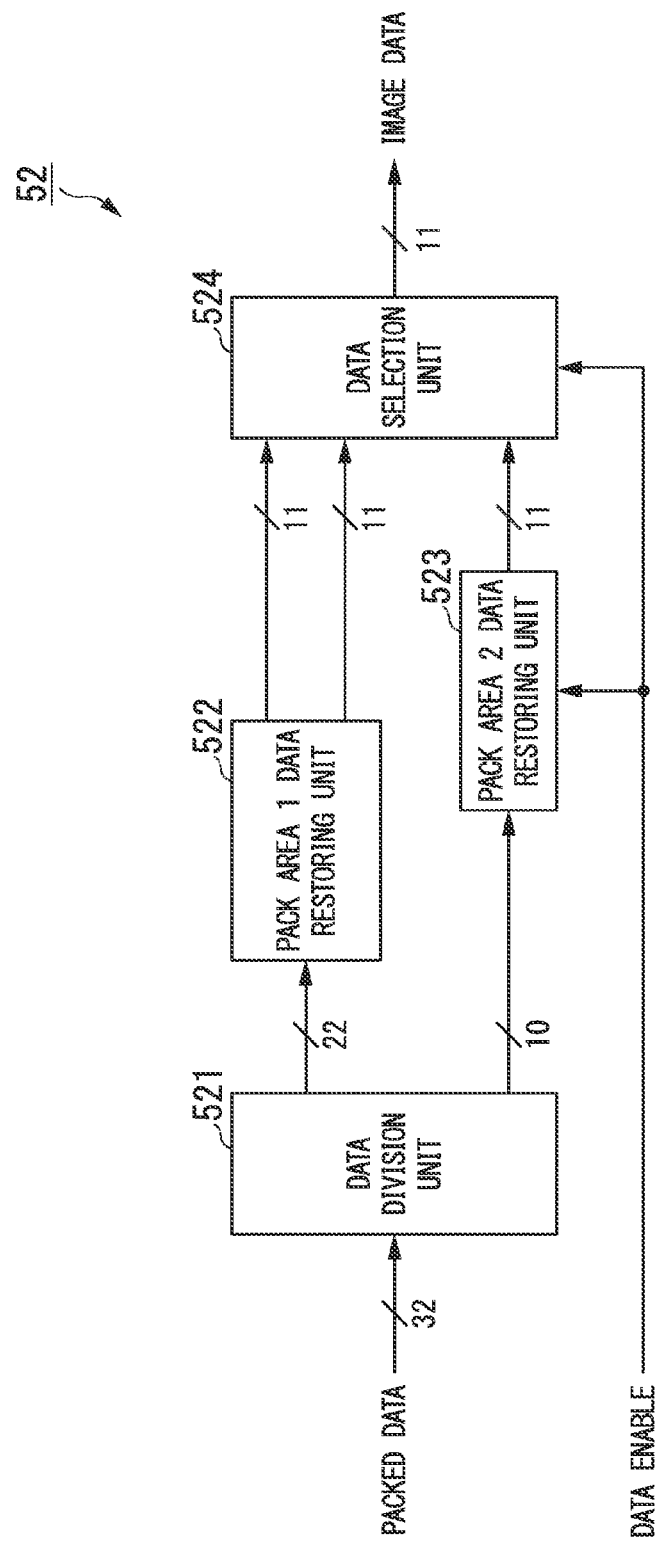
FIG. 3 is a block diagram illustrating a schematic configuration of a data inverse-conversion unit of the first configuration included in the imaging apparatus in accordance with the first preferred embodiment of the present invention.

FIG. 3 is a block diagram illustrating a schematic configuration of the data inverse-conversion unit 52 of the first configuration included in the image pickup device 1 in accordance with the first preferred embodiment of the present invention. As shown in FIG. 3, the data inverse-conversion unit 52 includes a data division unit 521, a pack area 1 data restoring unit 522, a pack area 2 data restoring unit 523, and a data selection unit 524.

Hereinafter, a case in which packed data of one burst, in which four transfers form a packing unit and which is packed by the data conversion unit 41, is input to the data inverse-conversion unit 52 via the input DMA unit 56, and the input packed data is restored to the Bayer data shown in FIG. 15, will be described. Accordingly, it is assumed that a bit number of each pixel data in the Bayer data is 11, and the memory bus width is 32 bits.

The data inverse-conversion unit 52 restores data arranged in each bit of the 32-bit packed data input from the input DMA unit 56 to original image data (Bayer data) image-processed by the image processing unit 50 using a method that is reverse to any of the prescribed packing methods, which will be described later, and outputs 11-bit pixel data. The data inverse-conversion unit 52 divides the packed data into 22-bit pack area 1 in which respective continuous bits of the original pixel data are directly arranged in respective continuous bits on the memory bus and 10-bit pack area 2 in which respective bits of the original pixel data are divided and arranged in the bits on the memory bus, and distributes the data of respective bits on the memory bus to respective bits of the original pixel data.

The original pixel data arranged in pack area 1 and the original pixel data arranged in pack area 2 in the data inverse-conversion unit 52 are determined based on a data enable signal input from the image processing unit 50. This data enable signal is a signal containing information indicating from what color of the pixel of the CCD 30 the original pixel data is output to the image processing unit 50.

The data division unit 521 divides the packed data into the pack area 1 data and the pack area 2 data. The data division unit 521 outputs the divided pack area 1 data (22-bit pack area 1 data in FIG. 3) to the pack area 1 data restoring unit 522 and the pack area 2 data (10-bit pack area 2 data in FIG. 3) to the pack area 2 data restoring unit 523.

The pack area 1 data restoring unit 522 divides the original pixel data for two pixels sequentially arranged in the respective bits of the pack area 1 data input from the data division unit 521, for example, into pixel data of bits at an upper side of the pack area 1 data (11 bits in FIG. 3) and pixel data of bits at a lower side (11 bits in FIG. 3). The pack area 1 data restoring unit 522 outputs the divided respective pixel data to the data selection unit 524.

The pack area 2 data restoring unit 523 divides pixel data for three pixels arranged in the respective bits of the pack area 2 data input from the data division unit 52 into respective pixel data based on the data enable signal input from the image processing unit 50. The pack area 2 data restoring unit 523 outputs the divided respective pixel data (11 bits in FIG. 3) to the data selection unit 524.

Further, the pack area 2 data restoring unit 523 divides the pixel data into the respective pixel data using a method reverse to the prescribed packing methods, which will be described later. Further, the pack area 2 data restoring unit 523, for example, includes a memory unit for temporarily storing the pack area 2 data for a packing unit (4 transfers). The pack area 2 data restoring unit 523 aligns the divided and arranged 11-bit pixel data in the pack area 2 data, based on the data enable signal input from the image processing unit 50 and outputs the resultant pixel data to the data selection unit 524.

The data selection unit 524 sequentially selects the pixel data input from the pack area 1 data restoring unit 522 or the pack area 2 data restoring unit 523 based on the data enable signal input from the image processing unit 50, and outputs the pixel data as the original pixel data divided (unpacked) by the data inverse-conversion unit 52 to the image processing unit 50. Further, the data selection unit 524 includes a memory unit for temporarily storing the 11-bit pixel data input from the pack area 1 data restoring unit 522 and the pack area 2 data restoring unit 523. The data selection unit 524 matches pixel data output timing based on the data enable signal input from the image processing unit 50 and sequentially outputs the respective pixel data to the image processing unit 50.

Next, a method of arranging (packing) the pixel data will be described. In the image pickup device 1 in accordance with the first preferred embodiment of the present invention, the data conversion unit 41 or 51 arranges input pixel data on the memory bus to generate packed data, and the data inverse-conversion unit 52 or 62 restores the input packed data to the original pixel data. Hereinafter, a case in which respective pixel data in the Bayer data shown in FIG. 15 is sequentially input to the data conversion unit 41 and packed into pack data of one burst in which four transfers form a packing unit will be described. It is assumed that a bit number of each pixel data in the Bayer data is 11, and the memory bus width is 32 bits.

Further, since a method of restoring the packed data to the original pixel data in the data inverse-conversion unit 52 or 62 is reverse to the pixel data packing method in the data conversion unit 41 or 51, a detailed description thereof will be omitted here.

First Data Arrangement Method

FIGS. 4A and 4B are diagrams illustrating a first data arrangement method (packing method) in the data conversion unit 41 of the first configuration. FIG. 4A illustrates an arrangement of pixel data in the packed data. FIG. 4B illustrates an arrangement of respective bits of pixel data in pack area 2 in the packed data.

As described above, usually, a change amount of pixel data is small between adjacent pixels in the image data. Accordingly, when the packed data is built, it is desirable to arrange the same bits of pixel data of adjacent pixels in the same bits of the memory bus in each transfer so that a change amount of respective bits of the memory bus in burst transfer is minimized.

Further, information of colors represented by respective pixel data in the image data is different according to an image format, such as Bayer, RGB, or YC422 dot sequential, when the image processing unit 50 performs image processing. Accordingly, when the packed data is built, it is desirable to arrange the pixel data with the same color in the same bits of the memory bus in each transfer so that a change amount of respective bits of the memory bus in burst transfer is minimized.

In the first packing method, the pack area 1 data generation unit 411 arranges the pack area 1 data so that adjacent pixel data with the same color in data of pack area 1 in the packed data between two continuous transfers is arranged in the same bits on the memory bus.

The pack area 2 data generation unit 412 fills respective bits of the pixel data and arranges the pack area 2 data so that pixel data is in raster order between four continuous transfers of vacant pack area 2 in the packed data in which the pixel data has not been arranged.

More specifically, the pack area 1 data generation unit 411 arranges (packs) respective pixel data ("R0," "G1," "R2," "G3," "R4," "G5," "R6" and "G7") in the Bayer data, that is, arranges "R0" and "G1" in the first transfer, "R2" and "G3" in the second transfer, "R4" and "G5" in the third transfer, and "R6" and "G7" in the fourth transfer sequentially from the least significant bit of the memory bus, as shown in FIG. 4A.

Further, the pack area 2 data generation unit 412 packs respective pixel data ("R8," "G9" and "R10") in the Bayer data, that is, packs bits [0] to [9] of "R8" in the first transfer, bit [10] of "R8" and bits [0] to bit [8] of "G9" in the second transfer, bits [9] and [10] of "G9" and bits [0] to [7] of "R10" in the third transfer, and bits [8] to [10] of "R10" in the fourth transfer sequentially from a lower bit of the memory bus in pack area 2, as shown in FIG. 4B.

When all the bits of the pixel data cannot be arranged in the pack area 2, next pixel data (e.g., pixel data "G11" in the Bayer data) is not packed. This is because the data conversion unit 41 packs each pixel data in a packing unit and accordingly packing a part of the pixel data "G11" causes the data "G11" to exceed the packing unit. Accordingly, bits of the data bus in the pack area 2 in which pixel data has not been arranged (bits [31] to [25] of the data bus in the fourth transfer in FIGS. 4A and 4B) are unused bits. Further, data having the same value (e.g., data "1" or "0") may be arranged in all the unused bits.

As the packed data is generated as described above, in the first packing method, discrepancy between locations of the bits of pixel data between the respective transfers is limited to the bits of pack area 2 in the overall memory bus width. Further, in the first packing method, the pixel data in the pack area 1 is arranged so that the adjacent pixel data with the same color is arranged in the same bits on the memory bus. Thus, a change amount of respective bits of the memory bus in the burst transfer can be reduced. Accordingly, in the first packing method, image data transfer efficiency can be maintained, similar to the conventional burst unit-based packing method, and power consumption due to transfer of image data can be reduced as compared with the conventional burst unit-based packing method.

Second Data Arrangement Method

Figure 5A:
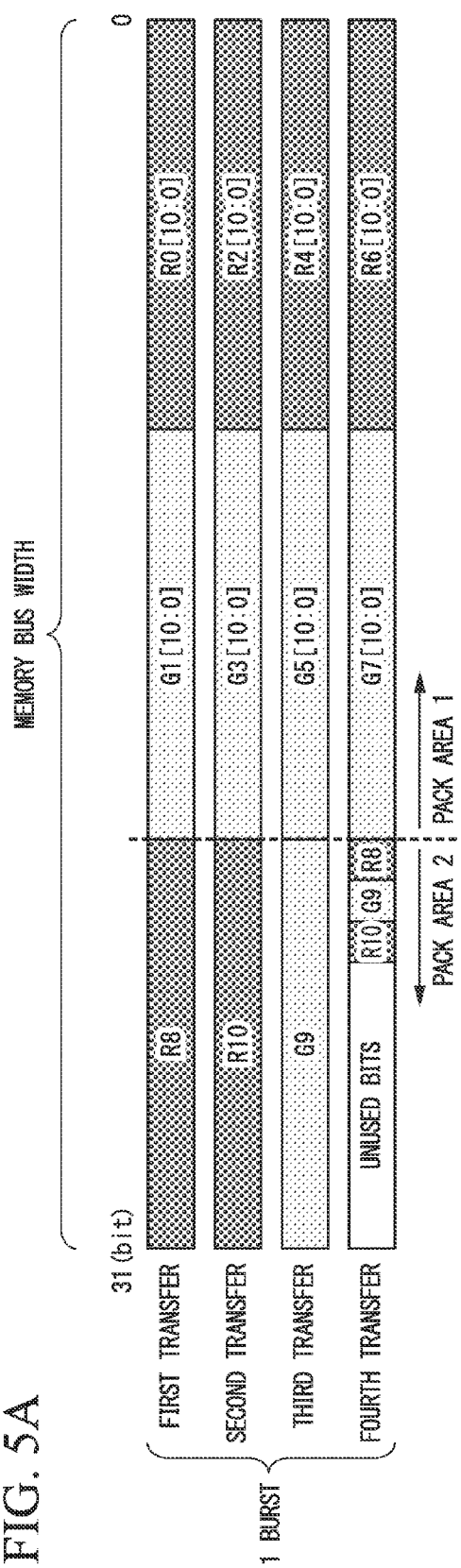
FIGS. 5A and 5B are diagrams illustrating a second data arrangement method in the data conversion unit of the first configuration.
Figure 5B:
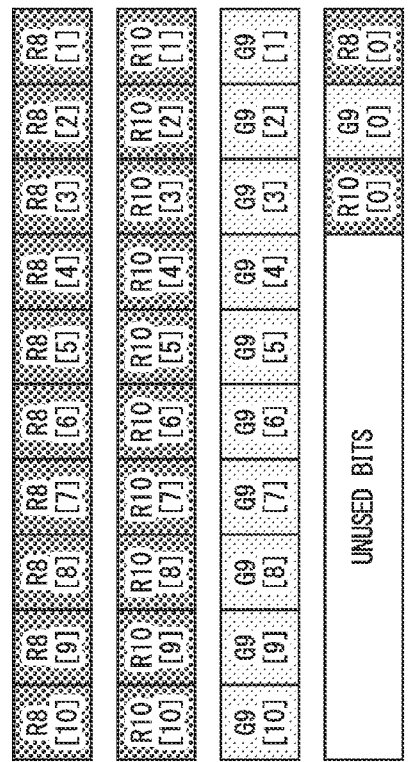

FIGS. 5A and 5B are diagrams illustrating a second data arrangement method (packing method) in the data conversion unit 41 of the first configuration. FIG. 5A illustrates arrangement of pixel data in packed data and FIG. 5B illustrates an arrangement of respective bits of pixel data in pack area 2 in the packed data.

In the second packing method, the pack area 1 data generation unit 411 arranges the pack area 1 data so that adjacent pixel data with the same color in data of pack area 1 in the packed data between two continuous transfers is arranged in the same bits on the memory bus, similar to the first packing method. Further, since a method of arranging packed data of pack area 1 in the second packing method is the same as the first packing method, a detailed description thereof will be omitted here.

Further, the pack area 2 data generation unit 412 divides the pixel data using the same bit location as a boundary in vacant pack area 2 in the packed data in which the pixel data is not arranged. The pack area 2 data generation unit 412 arranges the pack area 2 data so that adjacent pixel data with the same color of the divided pixel data is arranged in the same bits on the memory bus between two continuous transfers. Further, the divided vacant bits are arranged in the fourth transfer.

More specifically, the pack area 2 data generation unit 412 packs respective pixel data ("R8," "G9" and "R10") in the Bayer data, that is, packs bits [1] to [10] of "R8" in the first transfer, bits [1] to [10] of "R10" in the second transfer, and bits [1] to [10] of "G9" in the third transfer sequentially from a lower bit of the memory bus of the pack area 2, as shown in FIG. 5B. Further, the pack area 2 data generation unit 412 packs bit [0] of "R8", bit [0] of "G9", and bit [0] of "R10" in the fourth transfer, sequentially from a lower bit of the memory bus of the pack area 2.

When all the bits of the pixel data cannot be arranged in pack area 2, bits of the data bus in pack area 2 in which pixel data has not been arranged (bits [31] to [25] of the data bus in the fourth transfer, in FIGS. 5A and 5B) are unused bits, which is similar to the first packing method.

Thus, in the second packing method, even in pack area 2, the same bits of respective pixel data are arranged in the same bits on the memory bus (see the first to third transfers in FIGS. 5A and 5B). Further, the adjacent pixel data with the same color is arranged between two continuous transfers (see the first and second transfers in FIGS. 5A and 5B). Bits of each pixel data that have not been arranged in the first to third transfers are arranged in the fourth transfer. Accordingly, a change amount of respective bits of the memory bus in the burst transfer, particularly, a change amount of respective bits in pack area 2, can be further reduced as compared with the first packing method. Accordingly, in the second packing method, the power consumption due to the transfer of the image data can be further reduced as compared with the first packing method.

The case in which bits [0] of the respective pixel data are gathered and arranged when respective pixel data is arranged in pack area 2 in the second packing method shown in FIGS. 5A and 5B has been described. This is because the memory bus width of the pack area 2 is 10 bits and the bit number of the pixel data is 11. That is, when the pixel data is arranged on the memory bus, least significant bits of respective pixel data that could not be arranged on the memory bus in one transfer (bit [0] of each pixel data in FIGS. 5A and 5B) are gathered and arranged in the fourth transfer. Accordingly, when each pixel data that could not be arranged on the memory bus in one transfer consists of plural bits, the respective pixel data of the plural bits is gathered and arranged in the fourth transfer. Further, bits of each pixel gathered and arranged in the fourth transfer are preferably lower bits. This is because, for image data, usually, the lower bits of the pixel data are expected to have different values even between adjacent pixels according to, for example, a noise component in the image pickup device 1.

Third Data Arrangement Method

FIGS. 6A and 6B are diagrams illustrating a third data arrangement method (packing method) in the data conversion unit 41 of the first configuration. FIG. 6A illustrates an arrangement of pixel data in packed data and FIG. 6B illustrates an arrangement of respective bits of the pixel data in pack area 2 in the packed data.

In the third packing method, the pack area 1 data generation unit 411 arranges pixel data so that adjacent pixel data with the same color in data of pack area 1 in the packed data between two continuous transfers is arranged in the same bits on the memory bus, similar to the first and second packing methods. Further, since a method of arranging packed data of pack area 1 in the third packing method is the same as the first and second packing methods, a detailed description thereof will be omitted here.

The pack area 2 data generation unit 412 divides the pixel data using the same bit location as a boundary and arranges the pixel data in vacant pack area 2 in the packed data in which the pixel data is not arranged, similar to the second packing method. Further, in the third packing method, the pack area 2 data generation unit 412 rearranges pixel data of the same bits as the pixel data arranged in an immediately previous transfer, in unused bits in pack area 2, that is, copies and arranges the pixel data. Further, since a method of arranging packed data other than the unused bits in pack area 2 in the third packing method is the same as that in the second packing method, a detailed description thereof will be omitted here.

Here, the arrangement of the pixel data of the unused bits in the pack area 2 data generation unit 412 will be described in greater detail. The pack area 2 data generation unit 412 copies and rearranges pixel data arranged in bits [31] to [25] of the data bus in the third transfer (bits [4] to [10] of pixel data "G9" in FIG. 6B) to and in unused bits in the fourth transfer (bits [31] to [25] of the data bus in the fourth transfer in FIG. 6A).

Thus, in the third packing method, the same values as the pixel data arranged in directly previous transfer are arranged in the unused bits in pack area 2 (see the fourth transfer in FIG. 6A). Accordingly, a change amount of respective bits of the memory bus in the burst transfer, particularly, a change amount of the unused bits in pack area 2, can be further reduced as compared with the second packing method. Accordingly, in the third packing method, power consumption due to transfer of the image data can be further reduced as compared with the second packing method.

As described above, in the data conversion units 41 and 51 of the first configuration, it is possible to arrange the pixel data so that a change amount of respective bits of the memory bus in the burst transfer is reduced. Accordingly, in the data conversion units 41 and 51 of the first configuration, the image data transfer efficiency can be maintained similar to the conventional burst unit-based packing method, and the power consumption due to transfer of the image data can be further reduced as compared with the conventional burst unit-based packing method. Accordingly, pixel data transfer between each component (processing block) and the memory 20 in the image pickup device 1, that is, the power consumption due to pixel data delivery between respective components in the image pickup device 1, can be reduced.

Second Configuration

Figure 7:
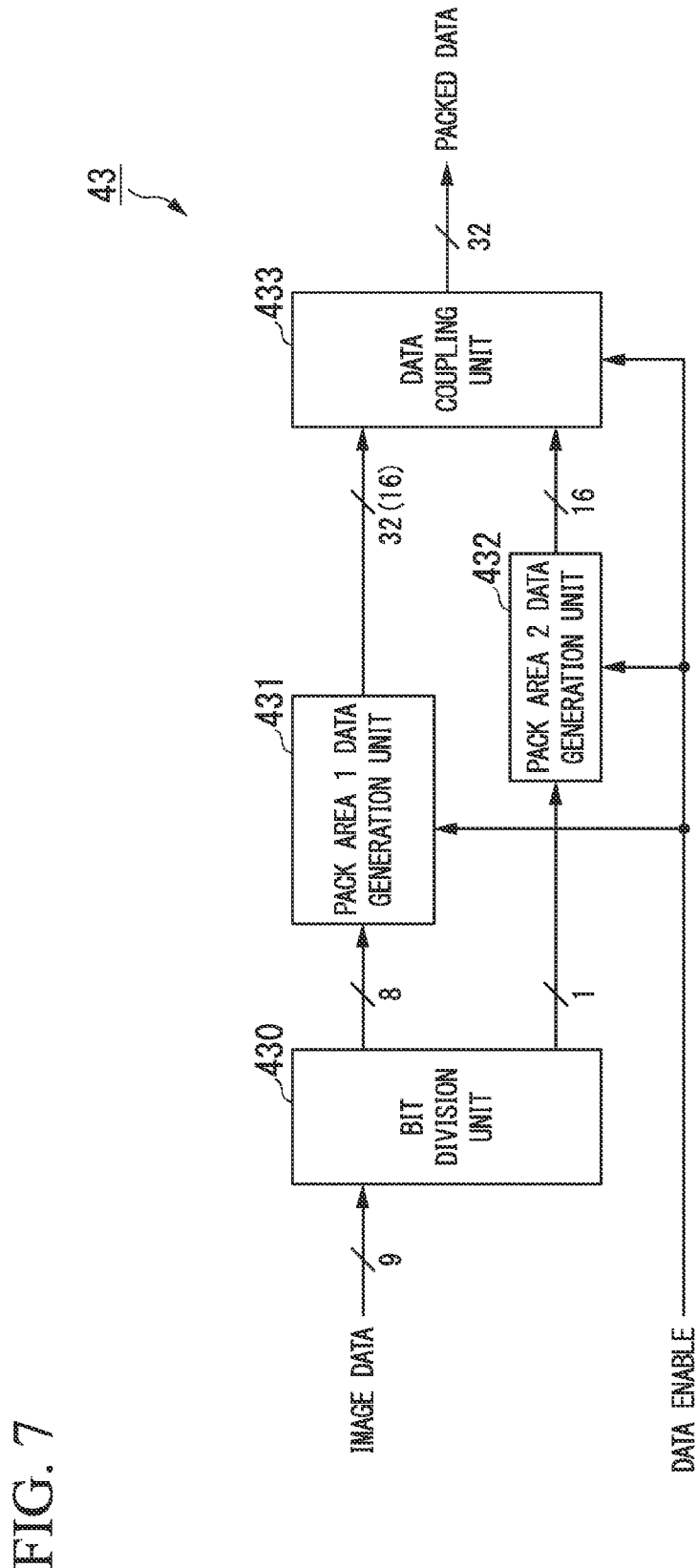
FIG. 7 is a block diagram illustrating a schematic configuration of the data conversion unit of the second configuration included in the image pickup device in accordance with the first preferred embodiment of the present invention.

Next, a data conversion unit of a second configuration will be described. FIG. 7 is a block diagram illustrating a schematic configuration of the data conversion unit 43 of the second configuration included in the image pickup device 1 in accordance with the first preferred embodiment of the present invention. The data conversion unit 43 shown in FIG. 7 is included in the image pickup device 1, instead of the data conversion unit 41 of the first configuration. Accordingly, the data conversion unit 43 may be included in the image pickup device 1, instead of the data conversion unit 51. As shown in FIG. 7, the data conversion unit 43 includes a bit division unit 430, a pack area 1 data generation unit 431, a pack area 2 data generation unit 432, and a data coupling unit 433.

Hereinafter, a case in which the 16×16 Bayer data as shown in FIG. 15 is input to the data conversion unit 43, four transfers form a packing unit for respective pixel data in the Bayer data, and a memory bus width is 32 bits, similar to the first configuration, will be described. In FIG. 7, it is assumed that a bit number of each pixel data in the Bayer data is 9, unlike the first configuration.

The data conversion unit 43 arranges data of each bit of the 9-bit pixel data input from the image pickup processing unit 40 in each bit on the memory bus using a prescribed packing method, which will be described later, to output 32-bit pack data. The data conversion unit 43 divides the packing unit into pack area 1 and pack area 2 and arranges each bit of the pixel data in each bit on the memory bus, similar to the data conversion unit 41 of the first configuration. However, a method of arranging each bit of the pixel data in each bit on the memory bus differs from that in the data conversion unit 41 of the first configuration. A detailed description of a method of arranging pixel data on the memory bus in the data conversion unit 43 will be described later.

The bit division unit 430 divides each input pixel data, for example, into upper 8-bit pixel data (hereinafter referred to as "upper pixel data") and lower 1-bit pixel data (hereinafter referred to as "lower pixel data"). The bit division unit 430 outputs the divided upper pixel data to the pack area 1 data generation unit 431. Also, the bit division unit 430 outputs the divided lower pixel data to the pack area 2 data generation unit 432.

The pack area 1 data generation unit 431 arranges the upper pixel data for 4 pixels in bits of the data bus of the pack area 1 (hereinafter described as "memory bus" since the data bus corresponds to bits of the memory bus), for example, sequentially from bits in locations corresponding to lower bits of the memory bus, based on the data enable signal input from the image pickup processing unit 40. The pack area 1 data generation unit 431 outputs pack area 1 data having a bit number of the memory bus width (32 bits in FIG. 7) obtained by sequentially arranging the upper pixel data, to the data coupling unit 433. When the pack area 1 data generation unit 431 outputs pack area 1 data of the fourth transfer to the data coupling unit 433, the pack area 1 data generation unit 431 outputs 16-bit pack area 1 data obtained by sequentially arranging the upper pixel data for 2 pixels, for example, from bits in positions corresponding to lower bits of the memory bus, to the data coupling unit 433. Also, the pack area 1 data generation unit 431 arranges the pack area 1 data so that adjacent pixel data with the same color in data between two continuous transfers when burst-transferring the upper pixel data to the memory 20 is arranged in the same bits on the memory bus.

The pack area 2 data generation unit 432 arranges lower pixel data for 14 pixels in respective bits of the data bus of the pack area 2 (hereinafter described as "memory bus" since the data bus corresponds to respective bits of the memory bus) based on the data enable signal input from the image pickup processing unit 40. The pack area 2 data generation unit 432 arranges the lower pixel data to output pack area 2 data having a bit number equal to or less than the memory bus width (16 bits in FIG. 7) to the data coupling unit 433. Further, the pack area 2 data generation unit 432, for example, includes a memory unit for temporarily storing a number 16 of 1-bit pixel data. The pack area 2 data generation unit 432 matches pixel data output timing based on the data enable signal input from the image pickup processing unit 40 and outputs the pack area 2 data to the data coupling unit 433 at the timing of the fourth transfer.

The data coupling unit 433 couples the pack area 1 data input from the pack area 1 data generation unit 431 and the pack area 2 data input from the pack area 2 data generation unit 432 to generate packed data. The data coupling unit 433 sequentially outputs the generated packed data to the output DMA unit 45. Further, the data coupling unit 433 sequentially outputs the pack area 1 data input from the pack area 1 data generation unit 431 as packed data to the output DMA unit 45 in the first to third transfers. Further, the data coupling unit 433 couples the 16-bit pack area 1 data input from the pack area 1 data generation unit 431 in the fourth transfer and the 16-bit pack area 2 data input from the pack area 2 data generation unit 432 to output packed data to the output DMA unit 45.

Further, the data coupling unit 433, for example, includes a memory unit for temporarily storing 16-bit pack area 1 data.

The data coupling unit 433 matches timing between 16-bit pack area 1 data of the fourth transfer and 16-bit pack area 2 data of the fourth transfer to generate 32-bit pack data based on the data enable signal input from the image pickup processing unit 40.

Next, the data inverse-conversion unit of the second configuration will be described. FIG. 8 is a block diagram illustrating a schematic configuration of the data inverse-conversion unit 54 of the second configuration included in the image pickup device 1 in accordance with the first preferred embodiment of the present invention. The data inverse-conversion unit 54 shown in FIG. 8 is included in the image pickup device 1, instead of the data inverse-conversion unit 52 of the first configuration. Accordingly, the data inverse-conversion unit 54 may be included in the image pickup device 1 instead of the data inverse-conversion unit 62. As shown in FIG. 8, the data inverse-conversion unit 54 includes a data division unit 541, a pack area 1 data restoring unit 542, a pack area 2 data restoring unit 543, a bit coupling unit 540, and a data selection unit 544.

Hereinafter, a case in which pack data of one burst in which four transfers form a packing unit and which is packed by the data conversion unit 43 is input to the data inverse-conversion unit 54 via the input DMA unit 56, and the input packed data is restored to the Bayer data shown in FIG. 15, similar to the first configuration, will be described. Accordingly, it is assumed that a bit number of each pixel data in the Bayer data is 9, and the memory bus width is 32 bits.

The data inverse-conversion unit 54 restores the data arranged in each bit of the 32-bit packed data, which is input from the input DMA unit 56, using a method reverse to the prescribed packing methods, which will be described later, to original image data (the Bayer data), which is image-processed by the image processing unit 50, and outputs 9-bit pixel data. The data inverse-conversion unit 54 divides the packing unit into pack area 1 and pack area 2 and distributes data of each bit on the memory bus in each bit of the original pixel data, similar to the data inverse-conversion unit 52 of the first configuration.

The data division unit 541 divides the packed data into pack area 1 data and pack area 2 data. The data division unit 541 outputs the divided pack area 1 data (the 32-bit pack area 1 data or the 16-bit pack area 1 data in FIG. 8) to the pack area 1 data restoring unit 542. Also, the data division unit 541 outputs the pack area 2 data (the 16-bit pack area 2 data in FIG. 8) to the pack area 2 data restoring unit 543.

The pack area 1 data restoring unit 542 divides the original upper pixel data for four pixels sequentially arranged in the respective bits of the pack area 1 data, which is input from the data division unit 541, for example, into four upper pixel data (8 bits in FIG. 8) of the pack area 1 data. The pack area 1 data restoring unit 542 outputs the divided respective upper pixel data to the bit coupling unit 540.

The pack area 2 data restoring unit 543 divides lower pixel data for 14 pixels arranged in respective bits of the pack area 2 data, which is input from the data division unit 541, into respective pixel data, based on the data enable signal input from the image processing unit 50. The pack area 2 data restoring unit 543 sequentially outputs the respective divided lower pixel data (1 bit in FIG. 8) to the bit coupling unit 540. The pack area 2 data restoring unit 543 divides the lower pixel data into respective lower pixel data using a method reverse to the prescribed packing methods, which will be described later.

The bit coupling unit 540 couples the upper pixel data input from the pack area 1 data restoring unit 542 and the lower pixel data input from the pack area 2 data restoring unit 543, and outputs the resultant pixel data to the data selection unit 544. Further, the bit coupling unit 540, for example, includes a memory unit for temporarily storing the upper pixel data for a packing unit (four transfers). The bit coupling unit 540 couples the upper pixel data corresponding to the input lower pixel data each time the lower pixel data is input from the pack area 2 data restoring unit 543, and aligns the 9-bit pixel data divided into the pack area 1 data and the pack area 2 data and arranged to output the resultant data to the data selection unit 544.

The data selection unit 544 sequentially selects the pixel data input from the bit coupling unit 540 based on the data enable signal input from the image processing unit 50, and outputs the pixel data as original pixel data divided (unpacked) by the data inverse-conversion unit 54 to the image processing unit 50. Further, the data selection unit 544 includes a memory unit for temporarily storing the 9-bit pixel data input from the bit coupling unit 540. The data selection unit 544 matches pixel data output timings based on the data enable signal input from the image processing unit 50 and sequentially outputs the respective pixel data to the image processing unit 50.

Next, a method of arranging (packing) pixel data in the second configuration will be described. In the image pickup device 1 in accordance with the first preferred embodiment of the present invention, for example, the data conversion unit 43 generates the pack data obtained by arranging the input pixel data in the memory bus, and the data inverse-conversion unit 54 restores the input packed data to the original pixel data. Hereinafter, a case in which respective pixel data in the Bayer data shown in FIG. 15 is sequentially input to the data conversion unit 43 and packed into packed data of one burst in which four transfers form a packing unit will be described. It is assumed that a bit number of each pixel data in the Bayer data is 9 and the memory bus width is 32 bits.

Since a method of restoring the packed data to the original pixel data in the data inverse-conversion unit 54 is a method reverse to the method of packing pixel data in the data conversion unit 43, a detailed description thereof will be omitted here.

Fourth Data Arrangement Method

FIGS. 9A, 9B and 9C are diagrams illustrating a fourth data arrangement method (packing method) in the data conversion unit 43 of the second configuration. FIG. 9A illustrates an example in which 9-bit pixel data is arranged on the memory bus using the second packing method described above. FIG. 9B illustrates arrangement of pixel data in the packed data using the fourth packing method. FIG. 9C illustrates an arrangement of respective bits of the pixel data in pack area 2 in the packed data using the fourth packing method.

In the fourth packing method, pack area 1 data is arranged so that adjacent pixel data with the same color in data of pack area 1 in the packed data between two continuous transfers is arranged in the same bits on the memory bus. Further, in pack area 2 in the packed data, pixel data is divided using the same bit location as a boundary, and pack area 2 data is arranged so that adjacent pixel data with the same color of the divided pixel data is arranged in the same bits on the memory bus between two continuous transfers.

Accordingly, in the second packing method, respective pixel data ("R0," "G1," "R2," "G3," "R4," "G5," "R6," "G7," "R8," "R10," "R12") in the Bayer data is arranged in pack area 1, and respective pixel data ("G9," "G11," "G13") in the Bayer data is arranged in pack area 2, as shown in FIG. 9A.

Even in the second packing method shown in FIG. 9A, since a change amount of respective bits of the memory bus in burst transfer is small, power consumption due to transfer of the image data can be reduced. However, power consumption is expected to increase due to bits [27] to [31] of the memory bus in the third transfer and bits [19] to [26] of the memory bus in the fourth transfer.

For image data, when a change amount of pixel data between adjacent pixels is small, upper bits of the pixel data are not expected to change but only lower bits. Accordingly, when pixel data is divided into upper bits and lower bits, the upper bits whose change amount is small are arranged in pack area 1 and the lower bits whose change amount is great are arranged in pack area 2 to build packed data, a change amount of respective bits of the memory bus in burst transfer may be further reduced.

In the fourth packing method, the bit division unit 430 divides the pixel data into the upper pixel data and the lower pixel data. The pack area 1 data generation unit 431 arranges the pack area 1 data so that adjacent upper pixel data with the same color in data of pack area 1 in the packed data between two continuous transfers is arranged in the same bits on the memory bus. Further, the pack area 2 data generation unit 432 arranges the divided lower pixel data in the fourth transfer.

More specifically, the bit division unit 430 divides each pixel data in the Bayer data into upper pixel data (bits [8] to [1]) and lower pixel data (bit [0]). The pack area 1 data generation unit 431 arranges (packs) the upper pixel data of "R0," "G1," "R8," and "G9" in the first transfer, the upper pixel data of "R2," "G3," "R10," and "G11" in the first transfer, the upper pixel data of "R4," "G5," "R12," and "G13" in the third transfer, and the upper pixel data of "R6" and "G7" in the fourth transfer, sequentially from the least significant bit of the memory bus, as shown in FIG. 9B.

Further, the pack area 2 data generation unit 432 packs the lower pixel data of "R0," "G1," "R2," "G3," "R4," "G5," "R6," "G7," "R8," "G9," "R10," "G11," "R12" and "G13," sequentially from a lower bit of the memory bus of the pack area 2. Further, bits [30] and [31] of the memory bus in the fourth transfer are unused bits. This is caused by the same reasons as the first configuration.

As the packed data is generated as described above, in the fourth packing method, discrepancy of bit locations of pixel data between respective transfers is limited to the bits of pack area 2 in an overall memory bus width, similar to the first configuration. Further, in the fourth packing method, since pack area 2 is limited to only the fourth transfer, a percentage of pack area 2 occupying the memory bus can be reduced. Accordingly, a change amount of respective bits of the memory bus in the burst transfer can be further reduced. Accordingly, in the fourth packing method, power consumption due to transfer of the image data can be further reduced as compared with the packing methods in the first configuration (the first to third packing methods).

Further, even in the fourth packing method, similar to the third packing method, pixel data arranged in bits [30] to [31] of the data bus in the third transfer (bits [7] and [8] of pixel data "G13" in FIGS. 9A, 9B and 9C) is copied to and rearranged in unused bits shown in FIGS. 9A, 9B and 9C, thereby reducing power consumption due to transfer of the image data.

As described above, in the data conversion unit 43 of the second configuration, it is possible to arrange pixel data so that a change amount of respective bits of the memory bus in the burst transfer is reduced. Accordingly, even in the data conversion unit 43 of the second configuration, image data transfer efficiency can be maintained similar to a conventional burst unit-based packing method, and power consumption due to transfer of the image data can be reduced as compared with a conventional burst unit-based packing method. Accordingly, it is possible to reduce power consumption due to pixel data transfer between each component (processing block) and the memory 20 in the image pickup device 1, that is, pixel data delivery between respective components in the image pickup device 1, similar to the data conversion unit 41 or 51 of the first configuration.

While the case in which the packing method of the preferred embodiment of the present invention is applied to the Bayer data has been described in the embodiment described above, the packing method of the preferred embodiment of the present invention is not limited to the application to the Bayer data and may be applied to several types of image data, such as RGB data, YCbCr data having YC422 or YC444 dot sequential format, and OSD data. Further, the packing method of the preferred embodiment of the present invention is not limited to application to the image data and may be applied to data having other formats, such as audio data.

Application Example

Next, an example in which the packing method in accordance with the first preferred embodiment of the present invention is applied to image data having other formats or data other than the image data will be described. First, an example in which the packing method in accordance with the first preferred embodiment of the present invention is applied to RGB data will be described. FIGS. 10A and 10B are diagrams illustrating an example in which the data arrangement method (packing method) in the data conversion unit 41 included in the image pickup device 1 in accordance with the first preferred embodiment of the present invention is applied to another image data (RGB data). An example in which a conventional burst unit-based packing method is applied to 8-bit RGB data is shown in FIG. 10A. An example in which the third packing method is applied to 8-bit RGB data is shown in FIG. 10B.

As shown in FIG. 10A, if RGB data (8 bits×3 colors=24 bits) is simply arranged using the conventional burst unit-based packing method, all bits of the 32-bit memory bus become pixel data having different colors. On the other hand, in the third packing method shown in FIG. 10B, respective bits of the memory bus in pack area 1 become the same bits of the pixel data with the same color in four transfers. Further, each bit of the memory bus in pack area 2 in the fourth transfer has the same value as each bit of the memory bus in the third transfer. Accordingly, a change amount of respective bits of the memory bus in burst transfer in pack area 1 can be reduced, and in pack area 2, there can be no change amount of respective bits of the memory bus in the third transfer and the fourth transfer. Accordingly, the power consumption due to transfer of the image data can be reduced.

Figure 11A:
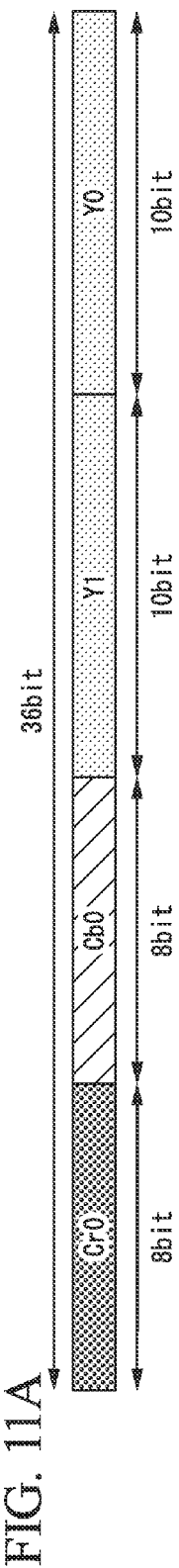
FIGS. 11A, 11B and 11C are diagrams illustrating an example in which the data arrangement method in the data conversion unit included in the image pickup device in accordance with the first preferred embodiment of the present invention is applied to another type of image data.
Figure 11B:
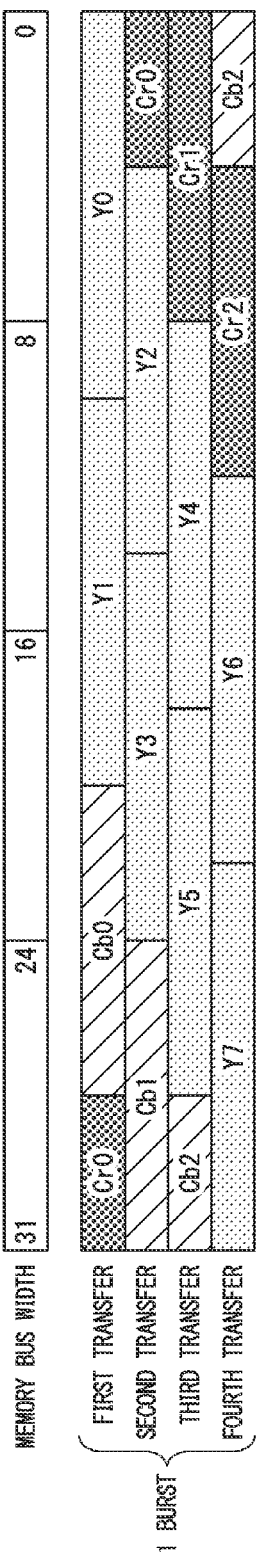
Figure 11C:
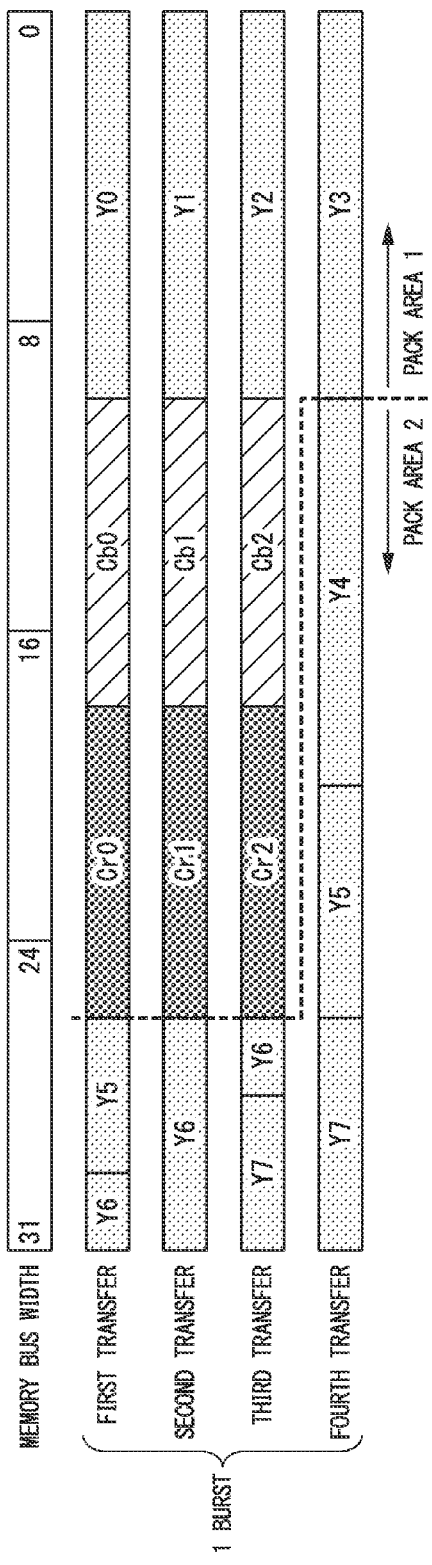
Figure 12:
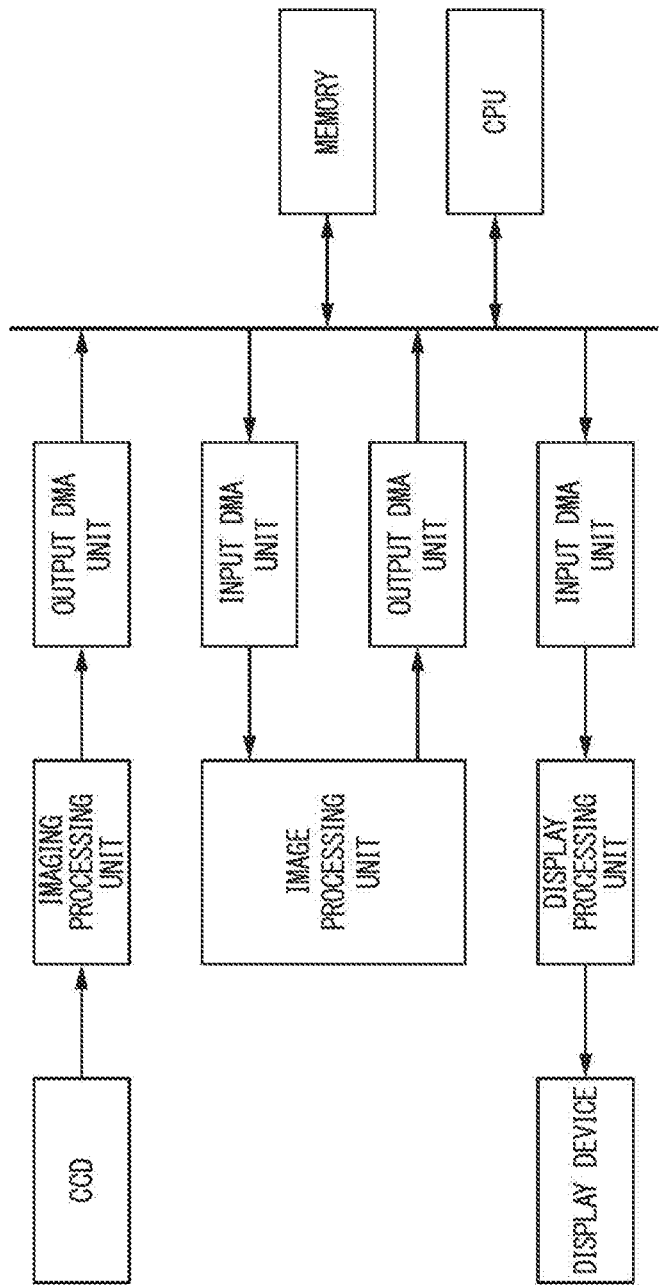
FIG. 12 is a block diagram illustrating a schematic configuration of an image pickup device in accordance with the related art.
Figures 14A, 14B:
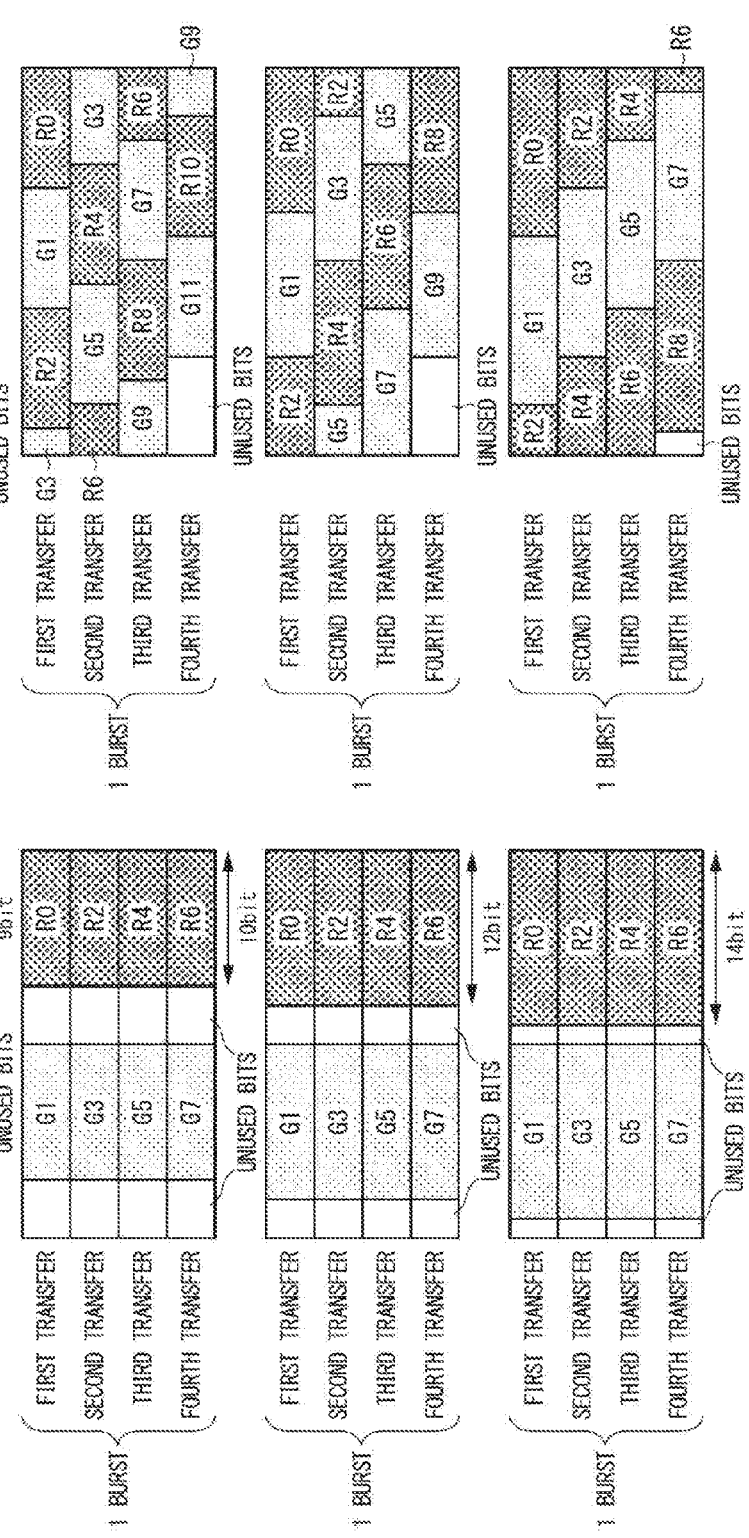
FIGS. 14A and 14B are diagrams illustrating an example of pixel data packing in accordance with the related art.
Figure 15A:
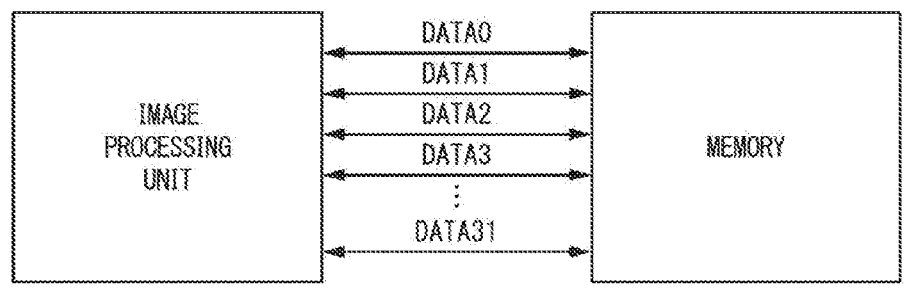
FIGS. 15A, 15B, 15C and 15D are diagrams illustrating a relationship between a data change on a data bus and a power consumption.
Figure 15B:
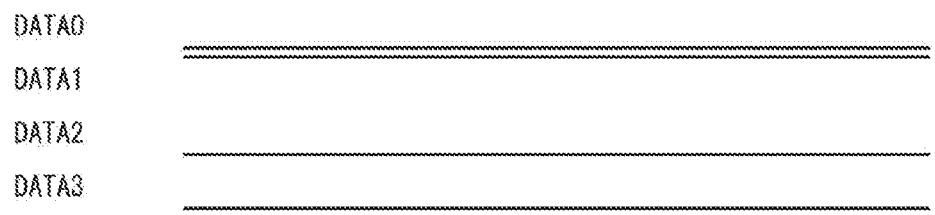
Figure 15C:
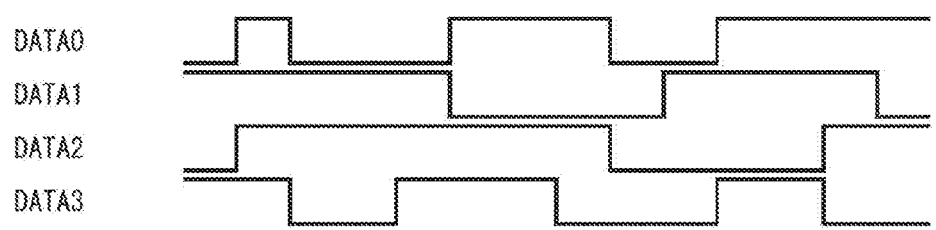
Figure 15D:
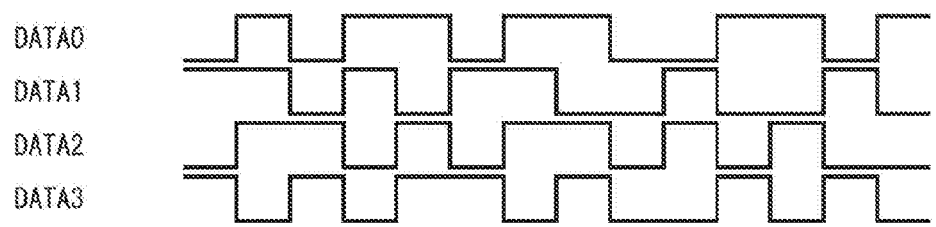
Figure 17:
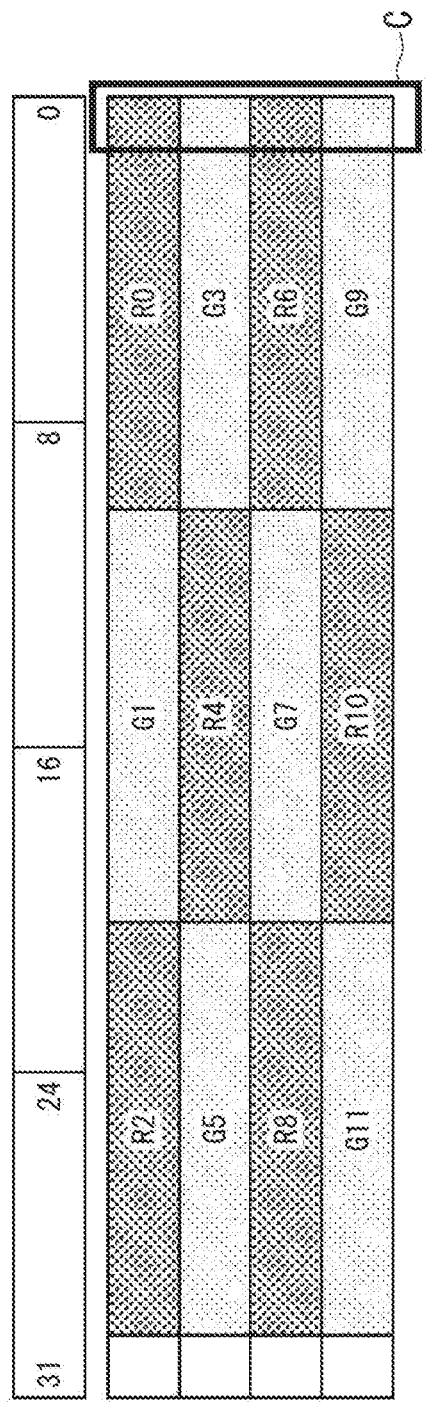
FIG. 17 is a diagram illustrating another example of a data arrangement state in the pixel data packing method in accordance with the related art.

FIGS. 11A, 11B and 11C are diagrams illustrating an example in which the data arrangement method (packing method) in the data conversion unit 41 included in the image pickup device 1 in accordance with the first preferred embodiment of the present invention is applied to another type of image data (YCbCr data). An example in which the conventional burst unit-based packing method is applied to 10-bit Y data and 8-bit Cb and Cr data as shown in FIG. 11A is shown in FIG. 11B. An example in which the first packing method is applied to 10-bit Y data and 8-bit Cb and Cr data as shown in FIG. 11A is shown in FIG. 11C.

As shown in FIG. 11B, if the YCbCr data is simply arranged using the conventional burst unit-based packing method, all bits of the memory bus become pixel data representing different colors. On the other hand, in the first packing method shown in FIG. 11C, the respective bits of the memory bus in pack area 1 become the same bits of pixel data indicating the same color. Accordingly, a change amount of respective bits of the memory bus in burst transfer in pack area 1 can be reduced, and power consumption due to transfer of the image data can be reduced. Further, as can be seen from the example shown in FIGS. 11A, 11B and 11C, the packing method in accordance with the first preferred embodiment of the present invention can be equally applied to a case in which bit numbers of respective data are different.

According to the preferred embodiment of the present invention, the memory bus width is divided into pack area 1 and pack area 2, as described above. Bits of transferred data are almost directly arranged in bits on the memory bus in pack area 1. Further, bits of transferred data are divided and arranged in bits on the memory bus in pack area 2. Accordingly, a change amount of respective bits of the memory bus in burst transfer can be reduced. Furthermore, data transfer efficiency can be maintained to be the same as conventional data transfer efficiency. Thus, the power consumption due to data delivery between each component (processing block) and the memory in the image pickup device can be sufficiently reduced.

While the case in which four transfers form a burst transfer unit and one burst is a data packing unit has been described in the preferred embodiment of the present invention, the number of transfers in one burst transfer and the data packing unit is not limited to the preferred embodiment of the present invention. For example, 64 transfers may form the burst transfer unit and 16 transfers in one burst may be the data packing unit, that is, four packing units may be included in one burst. Alternatively, for example, 16 transfers may form the data packing unit and eight transfers may form the burst transfer unit, that is, the packing unit may include two burst transfers.

While the case in which the packing method when data delivery between components in the image pickup device is performed is applied to some data has been described in the preferred embodiment of the present invention, an application scope of the packing method in accordance with the preferred embodiment of the present invention is not limited to the preferred embodiment of the present invention, and the packing method may be applied to any system in which data delivery is performed between components.

While the example in which the data conversion unit is arranged as a preceding processing block before the output DMA unit and the data inverse-conversion unit is arranged as a subsequent processing block after the input DMA unit has been described in the preferred embodiment of the present invention, the arrangements of the data conversion unit and the data inverse-conversion unit are not limited to the preferred embodiment of the present invention. For example, the data conversion unit may be a component of the output DMA unit and the data inverse-conversion unit may be a component of the input DMA unit. Furthermore, for example, the data conversion unit may be a component of a preceding image pickup processing unit and the data inverse-conversion unit may be a component of a subsequent image processing unit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A data processing apparatus that generates a data pack for burst-transferring a plurality of input data onto a data bus, the apparatus comprising:

a first data generation unit configured to set a first bus area and a second bus area on the data bus to thereby divide the data pack into a first pack area and a second pack area, extract first data and pack the first data in the first pack area without a gap so that the first data are transferred from the same position in the first bus area when burst-transferring the first data;

a second data generation unit configured to pack second data which are the input data remaining from the first data generation unit to the second pack area; and a data coupling unit configured to couple the first data packed in the first pack area and the second data packed in the second pack area to generate the data pack, wherein the plurality of input data are image data in which a plurality of color information are included, and adjacent data with the same colors in data of the first pack area of the data pack between two continuous transfers is arranged in the same bits on a memory bus.

2. The data processing apparatus according to claim 1, wherein the second data generation unit packs the second data so as to be continuous in the second pack area.

3. A data processing apparatus that restores packed original data from a data pack which is burst-transferred onto a data bus having a prescribed bit number, the apparatus comprising:

a data division unit configured to set the data bus to a first bus area and a second bus area, extract data of a first pack area of the data pack from the first bus area to output the data as first data, and extract data of a second pack area of the data pack from the second bus area to output the data as second data;

a first data restoring unit configured to restore the first data based on the data extracted from the first pack area;

a second data restoring unit configured to restore the second data based on the data extracted from the second pack area; and a data selection unit configured to output original data based on the restored first and second data, wherein the first data are packed in the first pack area without a gap so that the first data are transferred from the same position in the first bus area when burst-transferring the first data, wherein the packet original data are image data in which a plurality of color information are included, and adjacent data with the same colors in data of the first pack area of the data pack between two continuous transfers is arranged in the same bits on a memory bus.

4. The data processing apparatus according to claim 3, wherein the second data are packed so as to be continuous in the second pack area.

5. A data processing method for generating a data pack for burst-transferring a plurality of input data onto a data bus, the method comprising:

setting a first bus area and a second bus area on the data bus to thereby divide the data pack into a first pack area and a second pack area;

extracting first data and packing the first data in the first pack area without a gap so that the first data are transferred from the same position in the first bus area when burst-transferring the first data;

packing second data which are the input data remaining from the first data to the second pack area; and coupling the first data packed in the first pack area and the second data packed in the second pack area to generate the data pack, wherein the plurality of input data are image data in which a plurality of color information are included, and adjacent data with the same colors in data of the first pack area of the data pack between two continuous transfers is arranged in the same bits on a memory bus.

6. A data processing method for restoring packed original data from a data pack which is burst-transferred onto a data bus having a prescribed bit number, the method comprising:

setting the data bus to a first bus area and a second bus area, extracting data of a first pack area of the data pack from the first bus area to output the data as first data, extracting data of a second pack area of the data pack from the second bus area to output the data as second data;

restoring the first data based on the data extracted from the first pack area;

restoring the second data based on the data extracted from the second pack area; and outputting original data based on the restored first and second data, wherein the first data are packed in the first pack area without a gap so that the first data are transferred from the same position in the first bus area when burst-transferring the first data, wherein the packet original data are image data in which a plurality of color information are included, and adjacent data with the same colors in data of the first pack area of the data pack between two continuous transfers is arranged in the same bits on a memory bus.

* * * * *